United States Patent [19]

Hashimoto

[11] Patent Number: 5,124,800
[45] Date of Patent: Jun. 23, 1992

[54] APPARATUS FOR READING AND RECORDING IMAGE

[75] Inventor: Kenichiro Hashimoto, Yokohama, Japan

[73] Assignee: Canon Kabushiki Kaisha, Tokyo, Japan

[21] Appl. No.: 751,572

[22] Filed: Aug. 22, 1991

Related U.S. Application Data

[63] Continuation of Ser. No. 664,433, Mar. 4, 1991, which is a continuation of Ser. No. 463,015, Jan. 9, 1990, which is a continuation of Ser. No. 111,348, Oct. 27, 1987.

[30] Foreign Application Priority Data

Oct. 28, 1986 [JP]  Japan ................. 61-256688
Oct. 5, 1987 [JP]   Japan ................. 62-249929
Oct. 5, 1987 [JP]   Japan ................. 62-249930

[51] Int. Cl.⁵ ........................................ H04N 1/21
[52] U.S. Cl. ................................ 358/296; 346/108
[58] Field of Search ............... 358/296, 300, 302; 346/1.1, 107 R, 108, 160, 134; 355/202

[56] References Cited

U.S. PATENT DOCUMENTS

| 4,639,744 | 1/1987 | Uchikata et al. | 346/76 |
| 4,689,652 | 8/1987 | Shimada | 358/256 |
| 4,706,125 | 11/1987 | Takagi | 358/294 |
| 4,722,620 | 2/1988 | Igi et al. | 400/73 |
| 4,724,490 | 2/1988 | Tanioka | 358/294 |

FOREIGN PATENT DOCUMENTS 54-50332  4/1979  Japan.
59-99860  6/1984  Japan.
59-230360 12/1984  Japan.

Primary Examiner—Mark J. Reinhart
Attorney, Agent, or Firm—Fitzpatrick, Cella, Harper & Scinto

[57] ABSTRACT

A reader printer which is capable of employing a feed passage in common as a sheet feed passage for allowing a recording sheet of a recording system to be fed therethrough and an original feed passage for allowing an original to be fed therethrough so that it becomes possible to reduce the number of components, such as rollers and platens, which are conventionally needed for each of these passages, thereby enabling reductions in the size and price of the reader printer.

37 Claims, 18 Drawing Sheets

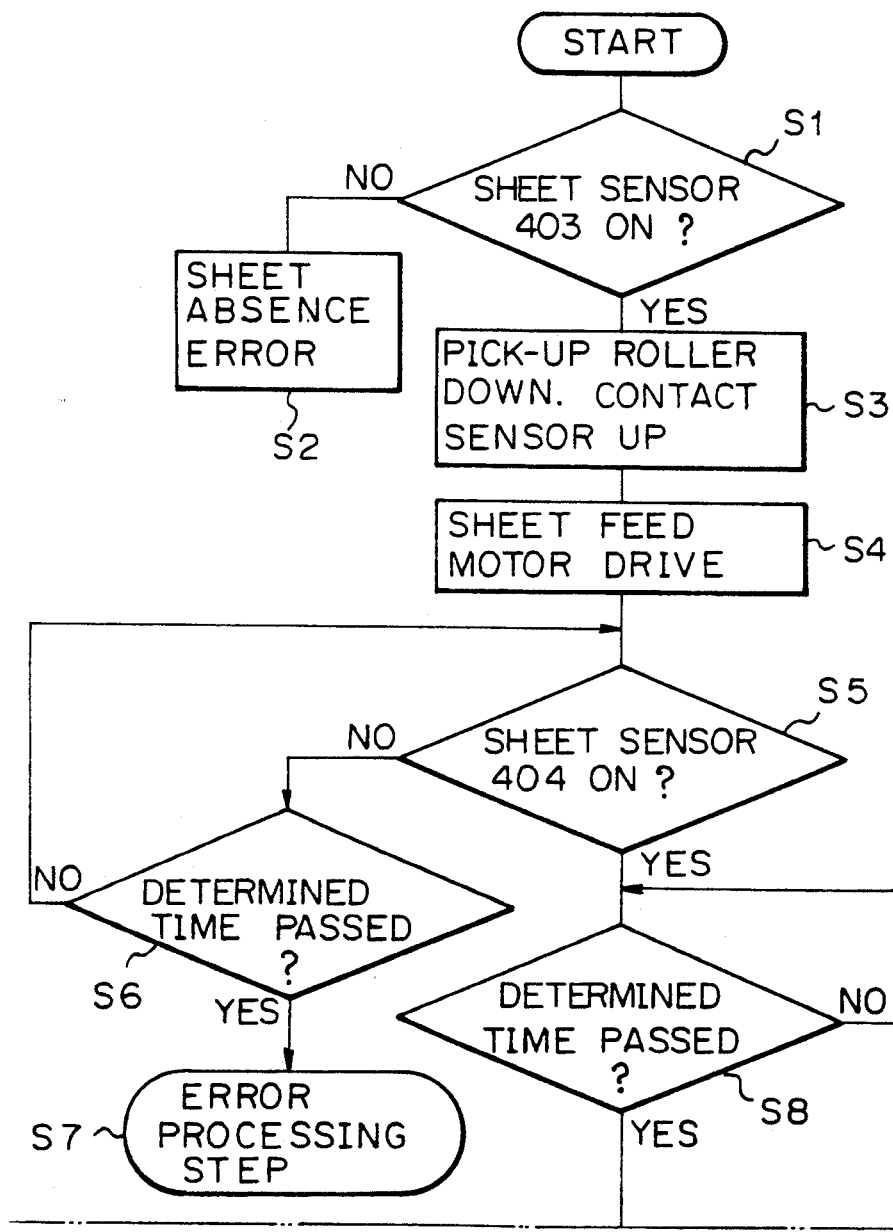
Fig.17(A)
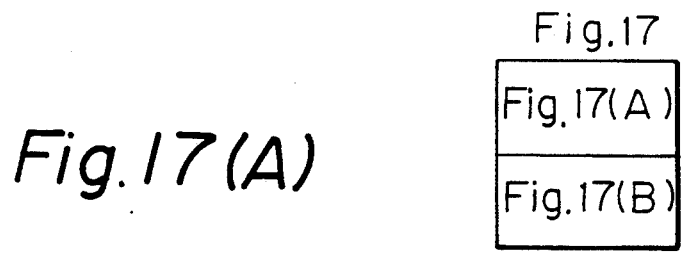

APPARATUS FOR READING AND RECORDING IMAGE

This application is a continuation of application Ser. No. 664,433 filed Mar. 4, 1991, which is a continuation of application Ser. No. 463,015 filed Jan. 9, 1990 which is a continuation of application Ser. No. 111,348 filed Oct. 22, 1987, all abandoned.

BACKGROUND OF THE INVENTION

1. Field of the Invention

The present invention relates to an improved reader recorder of the type having a function of reading an image from an original as well as a function of recording an image on a recording medium.

Typical examples of the images are characters, digits, figures or various patterns, and typical examples of the recording mediums are ordinary paper, OHP sheets or heat-sensitive paper.

2. Related Background Art

Apparatus such as copying machines or facsimile devices have heretofore been known which are capable of photoelectrically reading an image from an original and at the same time recording the image on a sheet-like recording medium. In such a conventional apparatus, however, a feed passage for allowing the original to be fed therethrough is provided separately from a feed passage for allowing the sheet-like recording medium to be fed therethrough. Therefore, the overall size of the apparatus unavoidably increases. In addition, drive means and rollers are needed for each of the feed passages, and this may lead to a problem in that the increased number of parts becomes needed and the cost of the resultant products rises.

SUMMARY OF THE INVENTION

It is therefore an object of the present invention to provide an improved reader recorder of the type having a function of reading an image from an original as well as a function of recording an image on a recording medium.

It is another object of the present invention to provide an improved reader recorder capable of employing one feed passage in common as a feed passage for allowing an original which bears an image to be fed therethrough and a feed passage for allowing a sheet-like recording medium for recording an image thereon to be fed therethrough.

It is another object of the present invention to provide a compact and inexpensive reader recorder.

It is another object of the present invention to provide an improved reader recorder capable of properly recording an image on a recording medium.

It is another object of the present invention to provide an improved reader recording capable of properly reading an image from an original.

Accordingly, a first feature of the present invention resides in a reader printer which is capable of employing a feed passage in common as a sheet feed passage for allowing a recording sheet to be fed therethrough and an original feed passage for allowing an original to be fed therethrough so that it becomes possible to reduce the number of components, such as rollers and platens, which are conventionally needed for each of the feed passage, thereby enabling reductions in the size and price of the reader printer.

A second feature of the present invention resides in a reader printer which comprises storage means capable of storing a plurality of sheets thereon; feed means for feeding each of the sheets from the storage means through a sheet feed passage to a recording on a sheet at the recording position; a photoelectric sensor disposed at an intermediate position of the sheet feed passage for photoelectrically reading an image from the sheet and providing the thus-read image to an input of a predetermined circuit, the photoelectric sensor further serving as a guide member adapted to allow the sheet to move toward the recording position; and displacement means for causing the photoelectric sensor to be displaced between predetermined positions for reading and non-reading operations. In the second feature, after the aforesaid feed means has fed one sheet, the feed means operates to prohibit feeding of the next sheet until reading from or recording on the former sheet is completed.

Further objects, features and advantages of the present invention will become apparent from the following description of preferred embodiments of the present invention with reference to the accompanying drawings.

DESCRIPTION OF THE PREFERRED EMBODIMENTS

A first preferred embodiment of the reader recorder of the present invention will be described below with reference to FIGS. 1 to 9.

A primary feature of the first embodiment, resides in a reader printer which is capable of employing a feed passage in common as a sheet feed passage for allowing a recording sheet of a recording system to be fed therethrough and an original feed passage for allowing an original of a reading system to be fed therethrough so that it becomes possible to reduce the number of components, such as rollers and platens, which are conventionally needed for each of these feed passages, thereby enabling reductions in the size and price of the reader printer.

Figure 1:
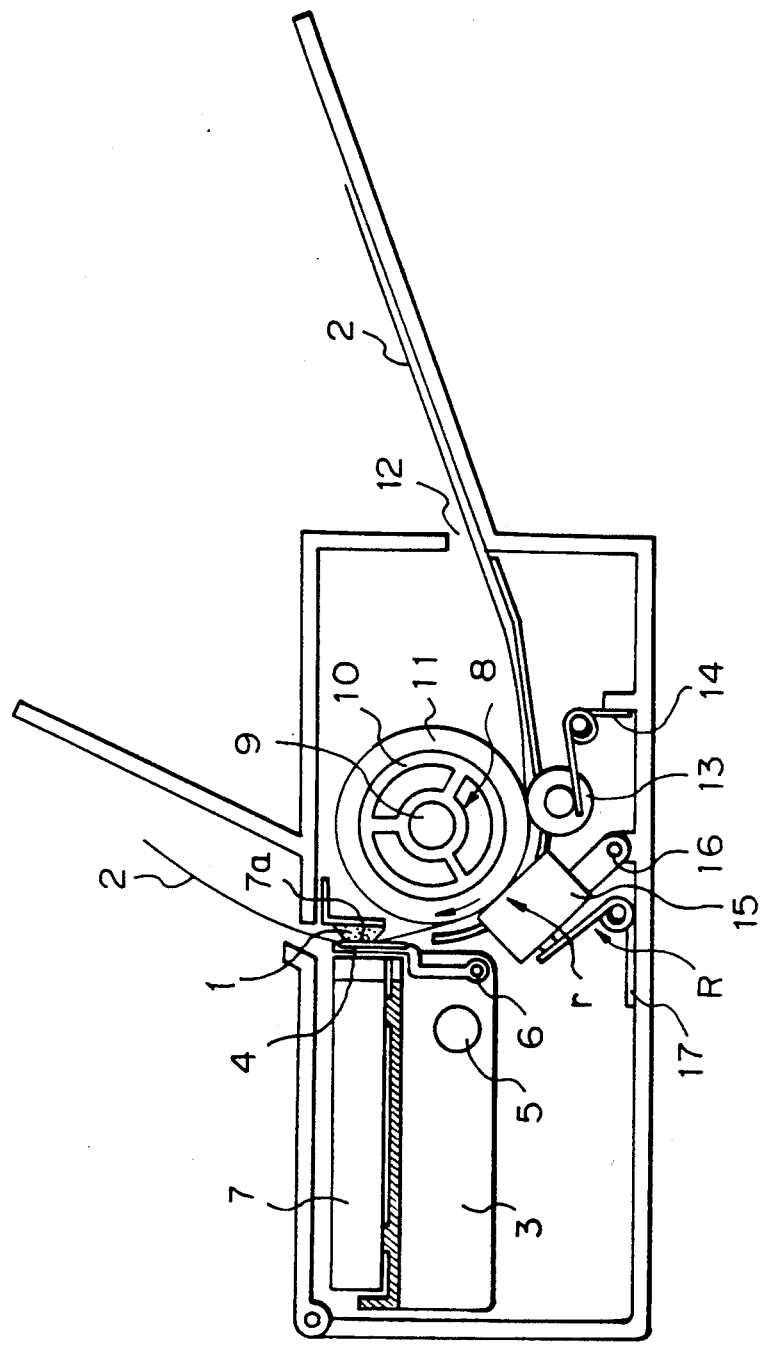
FIG. 1 is a diagrammatic, longitudinal section of a first preferred embodiment of a reader recorder in accordance with the present invention.

Referring to FIG. 1, the recording system of the first embodiment is essentially arranged such that a platen 1 (a flat platen in the illustrated embodiment) backs up a recording sheet 2 (e.g., a recording medium such as a sheet of paper or a piece of plastic film) so that recording can be effected on the recording sheet 2 by a recording head 4 carried by a carriage 3. A guide shaft 5 is disposed parallel to the longitudinal axis of the platen 1, and the carriage 3 is supported by the guide shaft 5 for linear movement therealong. The carriage 3 is caused to move reciprocally by a drive system comprised of a motor and a belt transmission mechanism (neither of which are shown).

By way of example, the illustrated recording head 4 is constituted by a thermal head including a plurality of heating elements, for example, such as thirty-two heating elements arranged in one or two columns. The recording head 4 is adapted to swing about its pivot point between a down position and an up position. At the down position, the recording head 4 is pressed into contact with the recording sheet 2 while, at the up position, the recording sheet 4 is separated therefrom. As illustrated, the recording head 4 is pivotably supported by a pivot shaft 6 attached to the carriage 3, and is driven upward and downward by a drive system (not shown).

The carriage 3 carries thereon a replaceable ink ribbon cassette 7 incorporating an ink ribbon 7a which passes through the gap between the thermal head and the recording sheet 2, to enable transfer recording.

During recording, the thermal head 4 is pressed against the flat platen 1 with the ink ribbon 7a and the recording sheet 2 interposed therebetween, and melts the ink at desired portions of the ink ribbon 7a by the application of heat, thereby transferring a desired dot pattern (an image) onto the recording sheet 2.

On the other hand, during sheet feed, the thermal head 4 is retracted from the flat platen 1 to allow the recording sheet 2 to be smoothly fed.

The foregoing is a description of the recording system (recorder section) incorporated in the reader printer shown in FIG. 1.

A feed roller 8 constitutes a part of the sheet feed system, and is rotated about its longitudinal axis by a feed motor (not shown).

The feed roller 8 is essentially constituted by three major parts; a shaft 9, a tubular metal member 10, and a rubber roller 11.

A sheet insertion opening 12 is formed in the rear of the reader printer, and the recording sheet 2 inserted through the opening 12 is fed to the nip between the feed roller 8 and the pinch roller 13. Thus the recording sheet 2 is fed forward while being tightly pressed against a portion of the peripheral surface of the feed roller 8.

The pinch roller 13 is pressed against the feed roller 8 by spring means 14, and the recording sheet 2 clamped between the rollers 13 and 8 is fed by frictional force to a recording section, that is, to the gap between the platen 1 and the recording head 4. The recording sheet 2 passes through the recording section, and the recording sheet 2 having an image so recorded is then discharged from an outlet 25.

The first embodiment further includes a contact-type read means (image sensor) 15 which is disposed, as viewed from the direction of rotation of the feed roller 8, downstream of a contact position at which the feed roller 8 is maintained in contact with the pinch roller 13. The read means 15 can pivot in an arc about a pivot point 16, and is normally pressed into contact with the peripheral surface of the feed roller 8 by spring means 17.

It is to be noted that the pivot point 16 is located upstream of a read position r with respect to the direction of rotation of the feed roller 8.

Figure 2:
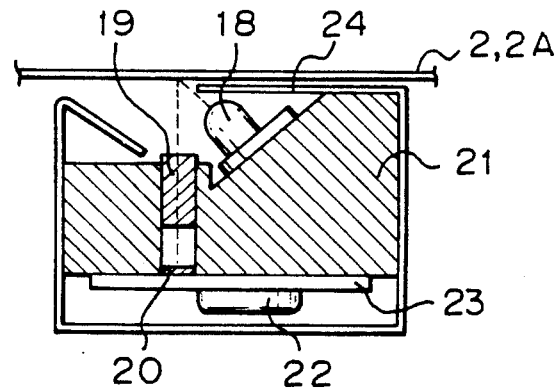
FIG. 2 is an enlarged, longitudinal section of reading mean in the first embodiment shown in FIG. 1.

FIG. 2 diagrammatically shows in cross section the contact-type read means 15.

As shown in FIG. 2, the read means 1 has a structure in which light emanating from an LED (light emitting diode) array 18 is reflected from an original (a sheet of paper) 2A, passes through an array 19 of imaging elements of a short focal length, and reaches a sensor (photoelectric element array) 20. Thus, image information on the original 2A is received by the sensor 20.

In FIG. 2, a support 21 is made from an aluminum diecasting or the like, and a printed circuit board 23 having an IC 22 is attached to the support 21. A sheet pressing portion 24 is formed adjacent to the original 2A.

More specifically, in the reader printer shown in FIG. 1, a passage from the insertion opening 12 to the outlet 25 through the nip between the feed roller 8 and the pinch roller 13 as well as through the nip between the recording head 4 and the flat platen 1 constitutes a common sheet feed passage which serves as both a feed passage for the recording sheet 2 of the recording system and a feed passage for the original 2A of the reading system.

In the first embodiment shown in FIG. 1, the feed roller 8 for the recording sheet 2 of the recording system also serves as a platen while the original 2A is being read by the reading system. The recording system is comprised of the recording head 4 and the flat platen 1, and the reading system is comprised of the contact-type reading means 15 and the feed roller 8, which serves as a platen for reading the original 2A. The recording system is disposed downstream of the reading system along the sheet feed passage as viewed in the direction in which the recording sheet 2 is fed.

In the first embodiment, the reading means 15 which is constituted by a line sensor having a length corresponding to the width of the original 2A to be read is capable of collectively reading one line of information at a time.

The first embodiment shown in FIGS. 1 and 2 provides the following advantages and effects.

First, reading of the original 2A and recording on the recording sheet 2 are enabled by employing the same sheet feed passage, utilizing the sheet feed roller 8 for the recording system as the platen for the reading system. This arrangement allows a reader printer to be realized which can be significantly reduced in size and number of parts.

For example, an ADF (auto document feeder) can also be used as an ASF (auto sheet feeder) and, in addition, the contact-type reading means 15 serves as a sheet pressing means. It is therefore possible to omit a dedicated sheet pressing means which is conventionally constituted by a spring or the like.

A second significant advantage of the first embodiment is that a recording operation such as printing can be effected on the original 2A itself. For instance, recording is enabled on a sheet with a printed format by adopting the following procedure. The format is first read by the reading means 15 located at an initial position of the sheet feed passage, and the thus-read information is displayed on a CRT (not shown). Then desired characters and signs are entered in accordance with the format displayed on the CRT and thus they can be recorded on the original 2A fed to the recording section.

A third advantage of the first embodiment is that there is accurate correspondence between the position of desired dots read by the reading means 15 and the position of dots displayed on the CRT as well as dots recorded on the recording section. Accordingly, characters or the like which are entered and recorded in an image of the original 2A displayed on the CRT can be recorded on the original 2A itself accurately at a desired portion thereof. More specifically, in an instance where a conventional type of word processor is employed to effect recording on the recording sheet 2 with a predetermined format, it has been difficult to position the recording sheet 2 correctly with respect to the recording head 4. In accordance with the first embodiment, however, even if an operator inserts the original 2A in a somewhat inaccurate manner, the operator can determine a recording position while viewing the CRT (not shown). Accordingly, the operator does not have to perform any special operation when inserting the original 2A.

A fourth advantage of the first embodiment is that it is possible to amend an error on the original 2A by employing an erasing ribbon instead of the recording ink ribbon 7a.

A fifth advantage of the first embodiment is that the contact-type recording means 15 can be employed to detect the presence of the recording sheet 2 and to discern the width thereof.

A sixth advantage of the first embodiment is that, if an OHP sheet superimposed on the original 2A is inserted, the original 2A is read and at the same time the thus-read information can be copied on the OHP sheet by a printer.

Figure 3:
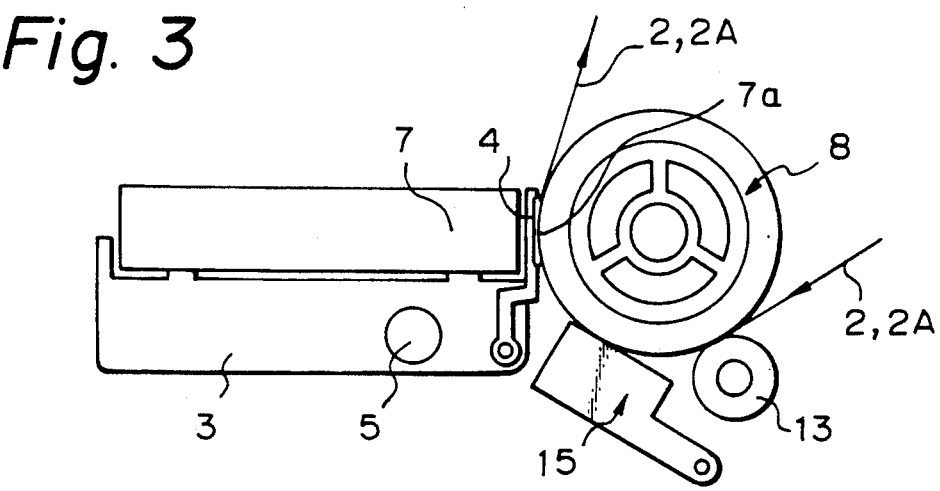
FIG. 3 is a diagrammatic, longitudinal section of the essential of a first modified form of the first embodiment of the reader printer shown in FIG. 1.

FIG. 3 shows the essential portion of a first modified form of the first preferred embodiment of the reader recorder in accordance with the present invention. The first modified form has a structure in which the sheet feed roller 8 is used as a platen roller for the recording head 4 as well as a platen for the reading means (image sensor) 15.

The structure of the remaining portion of the first modified form is substantially identical to that of the first embodiment shown in FIG. 1. Therefore, in FIG. 3, like reference numerals are used to denote the like or corresponding elements relative to those in the first embodiment, and the detailed description thereof is omitted.

The first modified form shown in FIG. 3 is of course capable of providing effects similar to those of the first embodiment shown in FIG. 1. In addition, the sheet feed roller 8 serves as both the platen for the recording system and that for the reading system, thus enabling a further reduction in the number of parts, the size, and the price of the reader recorder.

Figure 4:
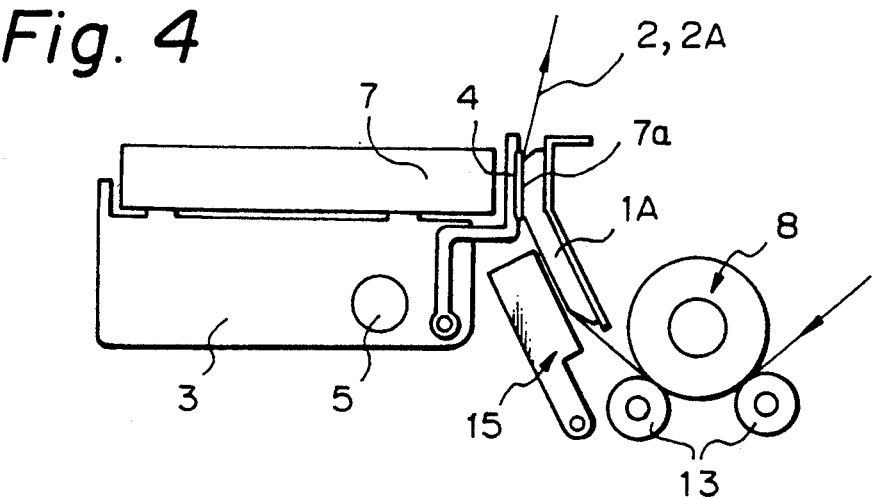
FIG. 4 is a diagrammatic, longitudinal section of the essential portion of a second modified form of the first embodiment.

FIG. 4 shows the essential portion of a second modified form of the first embodiment of the present invention. The second modified form differs in structure from the first embodiment of FIG. 1 in that a flat platen 1A for the recording system serves as a platen for the contact-type reading means (image sensor) 15. In FIG. 4, like reference numerals are used to denote the like or corresponding elements relative to those shown in FIG. 1, and the detailed description thereof is omitted.

It will be appreciated that the second modified form of FIG. 4 is capable of providing effects similar to those of the first embodiment shown in FIG. 1.

Figure 5:
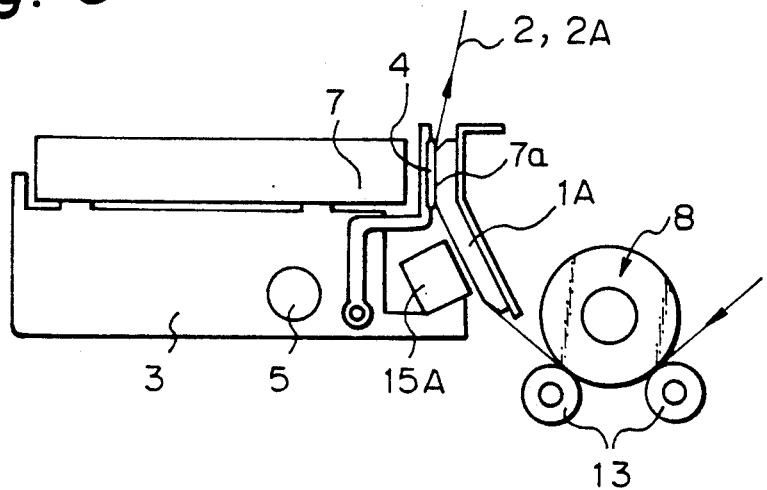
FIG. 5 is a diagrammatic, longitudinal section of the essential portion of a third modified form of the first embodiment.

FIG. 5 shows a third modified form of the first embodiment of the reader recorder of the present invention. The third modified form features a structure in which a serial type image sensor 15A carried by the carriage 3 for the recording system is adapted to scan in the widthwise direction of the original 2A when conducting reading of the same.

Figure 6:
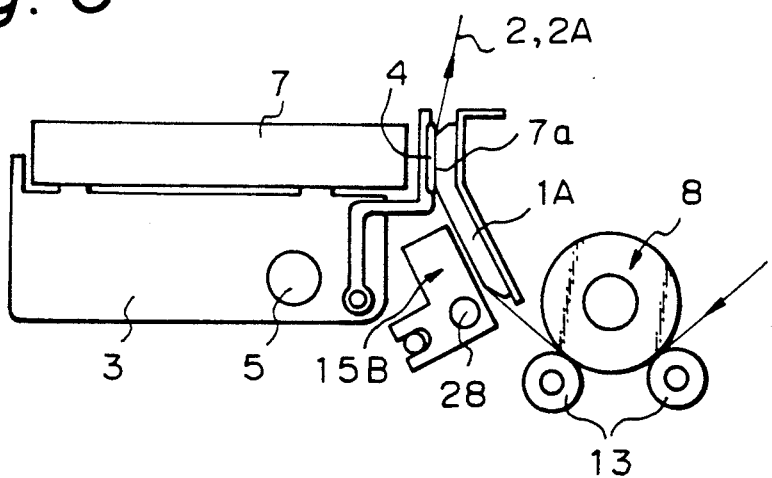
FIG. 6 is a diagrammatic, longitudinal section of the essential portion of a fourth modified form of the first embodiment.
Figure 7:
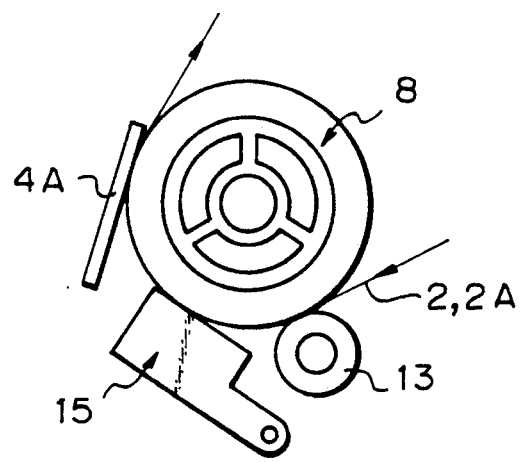
FIG. 7 is a diagrammatic, longitudinal section of the essential potion of a fifth modified form of the first embodiment.

FIG. 6 shows a fourth modified form of the reader recorder of the present invention. The fourth modified form has a structure in which a serial type image sensor 15B is supported for reciprocal movement along a guide shaft 28 extending parallel to the longitudinal axis of the flat platen 1A, the image sensor 15B being controlled by an independently incorporated drive system (not shown). The image sensor 15B is adapted to scan the original 2A in the widthwise direction thereof and thus read the same.

In the above-described respective embodiment and modified forms shown in FIGS. 1 to 6, each of the reading means (image sensors) 15, 15A and 15B may be constituted by a general sensor employing a lens instead of the contact-type sensor such as that shown in FIG. 2.

As required, the recording system may be of a heat sensitive type, an ink jet type, or a wire dot type, instead of the illustrated head transfer type. In addition, the recording head may be constituted by a line head 4A of the type shown in FIG. 7 capable of collectively recording one line of information at a time or a page print head (not shown) capable of collectively recording one page at a time, instead of the above-described serial type recording head 4.

Figure 8:
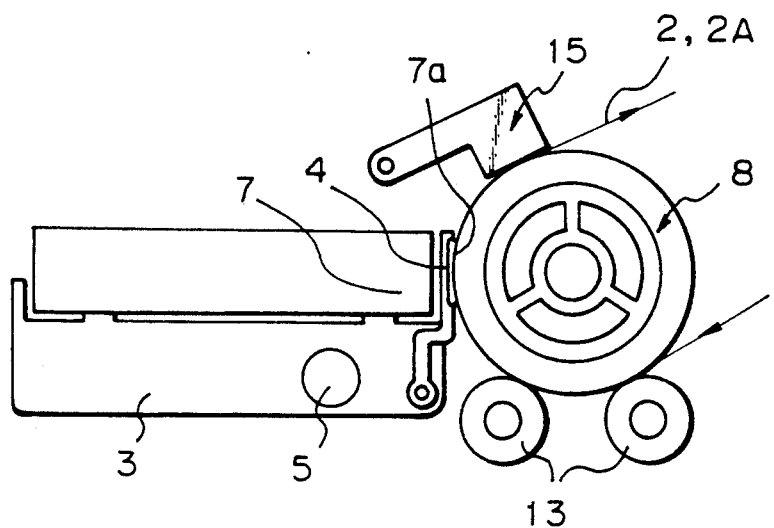
FIG. 8 is a diagrammatic, longitudinal section of the essential portion of a sixth modified form of the first embodiment.
Figure 9:
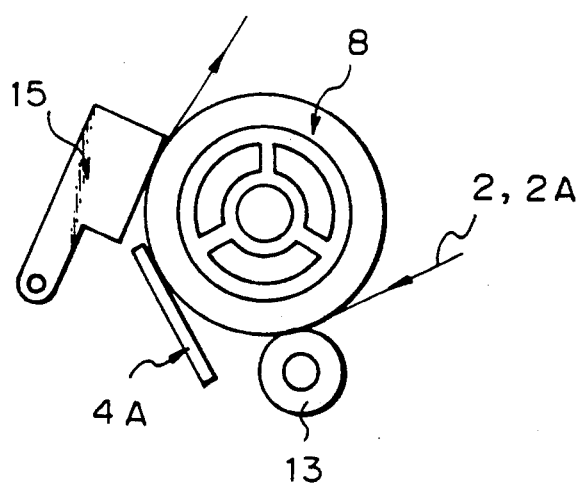
FIG. 9 is a diagrammatic, longitudinal section of the essential portion of a seventh modified form of the first embodiment.

In the above-described first embodiment and its modified forms, the recording system is located downstream of the reading system along the sheet feed passage. However, as shown in FIGS. 8 and 9, the reading means 15 may be disposed as required downstream of the recording means (recording head 4 or 4A).

As will be evident from the foregoing, in accordance with the aforesaid first embodiment, a novel and improved reader recorder is provided in which a common feed passage is employed as both the feed passage for the recording sheet of the recording system and the feed passage for the original of the reading system. This arrangement enables a reduction in the size and price of the reader printer as well as a variety of potential usages thereof by functional extension.

As shown in FIGS. 3 to 6 and 8, during recording, the ink ribbon 7a is maintained in contact with the recording sheet 2. In an instance where the sensor 15, 15A or 15B reads an image from the original 2A, the recording head 4 is moved backwardly to prevent the ink ribbon 7a from abutting against the original 2A.

A second embodiment of the reader recorder of the present invention will be described in detail below with reference to FIGS. 10 to 17.

The second embodiment which will be described below is characterized by a reader printer which comprises storage means capable of storing a plurality of sheets therein; feed means for feeding each of the sheets from the storage means through the sheet feed passage to a recording position; recording means for effecting recording on a sheet at the recording position; a photoelectric sensor disposed at an intermediate position of the sheet feed passage for photoelectrically reading the sheet and providing the thus-read image to an input of a predetermined circuit, the photoelectric sensor further serving as a guide member adapted to allow the sheet to move toward the recording position; and displacement means for causing the photoelectric sensor to be displaced between predetermined positions for reading and non-reading operations. In the second embodiment, after the aforesaid feed means has fed one sheet, the feed means operates to prohibit feeding of the next sheet until reading from or recording on the former sheet is completed.

In the second embodiment having the above-described arrangement, from the storage means capable of storing a plurality sheets thereon, one sheet of is fed through the sheet feed passage to the recording position. The photoelectric sensor, which is disposed at an intermediate position of the sheet feed passage, photoelectrically reads the sheet and provides the thus-read information to an input of a predetermined circuit and, in addition, guides the sheet toward the recording position. The photoelectric sensor is displaced between predetermined positions by the displacement means for reading and non-reading operations. In a non-reading operation, the photoelectric sensor serves as a sheet guide while, in a reading operation, it is brought into contact with the sheet to effect reading from the sheet.

The second embodiment will be explained with reference to a reader printer, by way of example.

Figure 10:
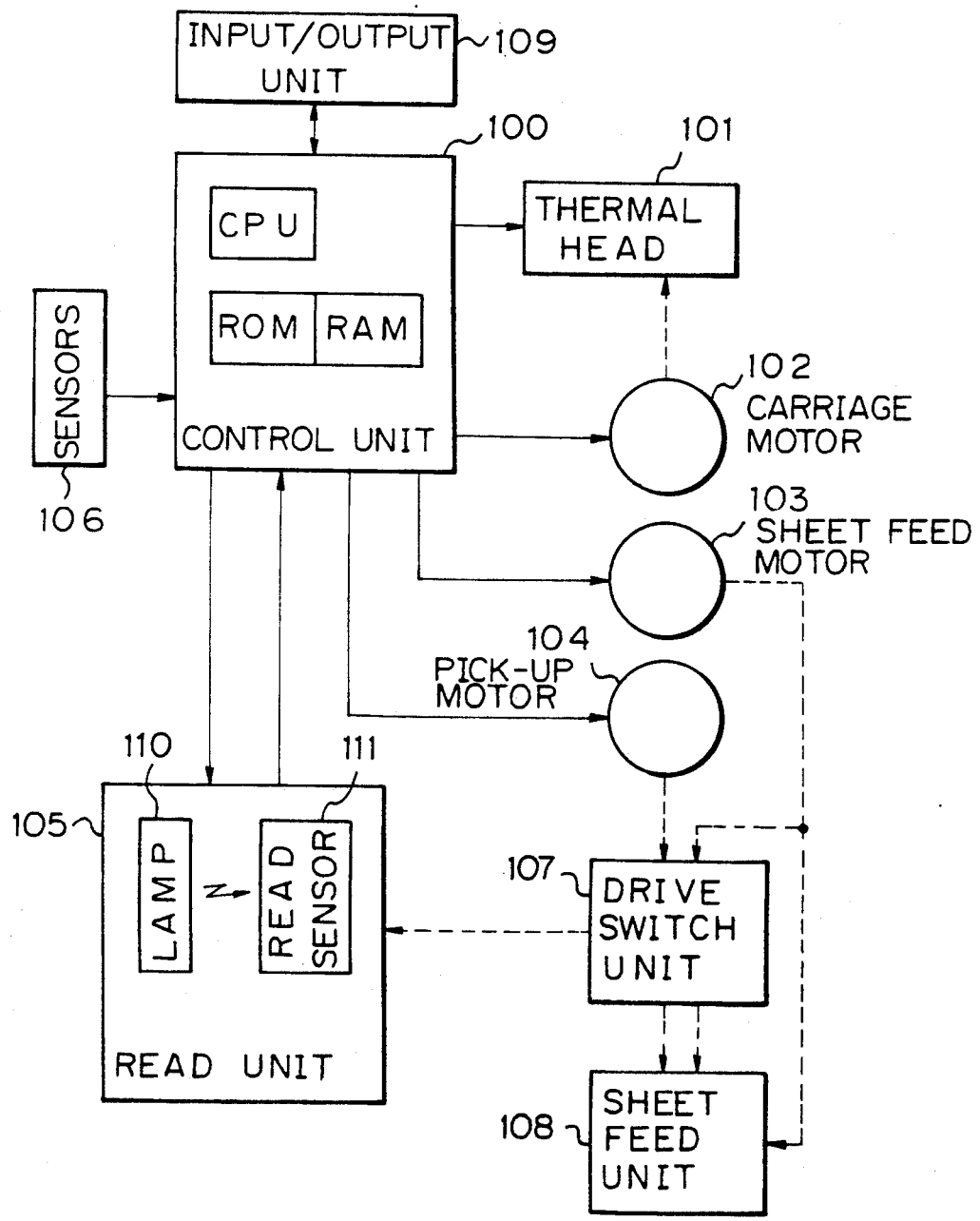
FIG. 10 is a block diagram showing the functional construction of a reader printer constituting the second embodiment of the present invention.

General Description of Reader Printer (FIG. 10)

FIG. 10 is a block diagram showing the general functional construction of the reader printer constituting the second embodiment.

In FIG. 10, a control unit 100 for controlling the operation of each component of the reader printer is provided with a CPU such as a microprocessor, a ROM for storing therein control programs for the CPU and various kinds of data, and a RAM serving as a work area for the CPU as well as temporarily holding the various kinds of data. A thermal head 101 is carried by a carriage 200 (FIG. 11) for effecting serial recording. The carriage 200 further carries a carriage motor 102 and associated components which cooperate with one another to cause feeding of an ink ribbon 201a (FIG. 11) for heat transfer recording as well as movement of the carriage 200.

A sheet feed motor 103 is actuated to feed a recording sheet or an original to be read, and the rotational force of the sheet feed motor 103 is transmitted to a sheet feed unit 108 including a sheet feed roller, a platen, and a pick-up roller 308 (FIG. 12) which will be described later. A pick-up motor 104 causes upward and downward movement of the pick-up roller 308 and that of the read sensor 111 (having a CCD or the like) of a read unit 105. The rotational force of the pick-up motor 104 drives a cam 303 (FIG. 12) of a drive switch unit 107. As the cam 303 moves, the pick-up roller 308 and the read sensor 111 are moved upwardly and downwardly in an interlocking relationship with each other, thereby controlling the feeding of sheets, such as recording sheets or originals, which are stored in a sheet storage section (a stacker in the second embodiment).

A read unit 105 is adapted to photoelectrically read an image from an original. A lamp 110 emits light in accordance with a command issued by the control unit 100, and the read sensor 111 reads the portion of the original illuminated by the emission of the lamp 110. The thus-read information is converted into a corresponding digital signal and is delivered to the control unit 100. The read sensor 111 has a length substantially equivalent to the width of the original, and is disposed substantially perpendicular to the direction of feed of the original. Sensors indicated collectively at 106 include a sheet sensor for detecting the feed of the sheet, a home position sensor for detecting the fact that the carriage 200 is located at a home position, a guide sensor for detecting the width of a sheet guide member, a ribbon cassette sensor for detecting the presence of an ink ribbon cassette, and so forth. An input/output unit 109 receives recording data from external equipment and sends image data representative of an original that has been read to the external equipment.

With this arrangement, it is possible to sequentially feed each of the recording sheets from the stacker to the recording position at which heat transfer recording is effected on the basis of data supplied from the external equipment. In addition, each of the originals stored in the stacker can likewise be fed to the reading position at which the original is read.

General Description of Mechanism (FIGS. 11 to 14)

Figure 11:
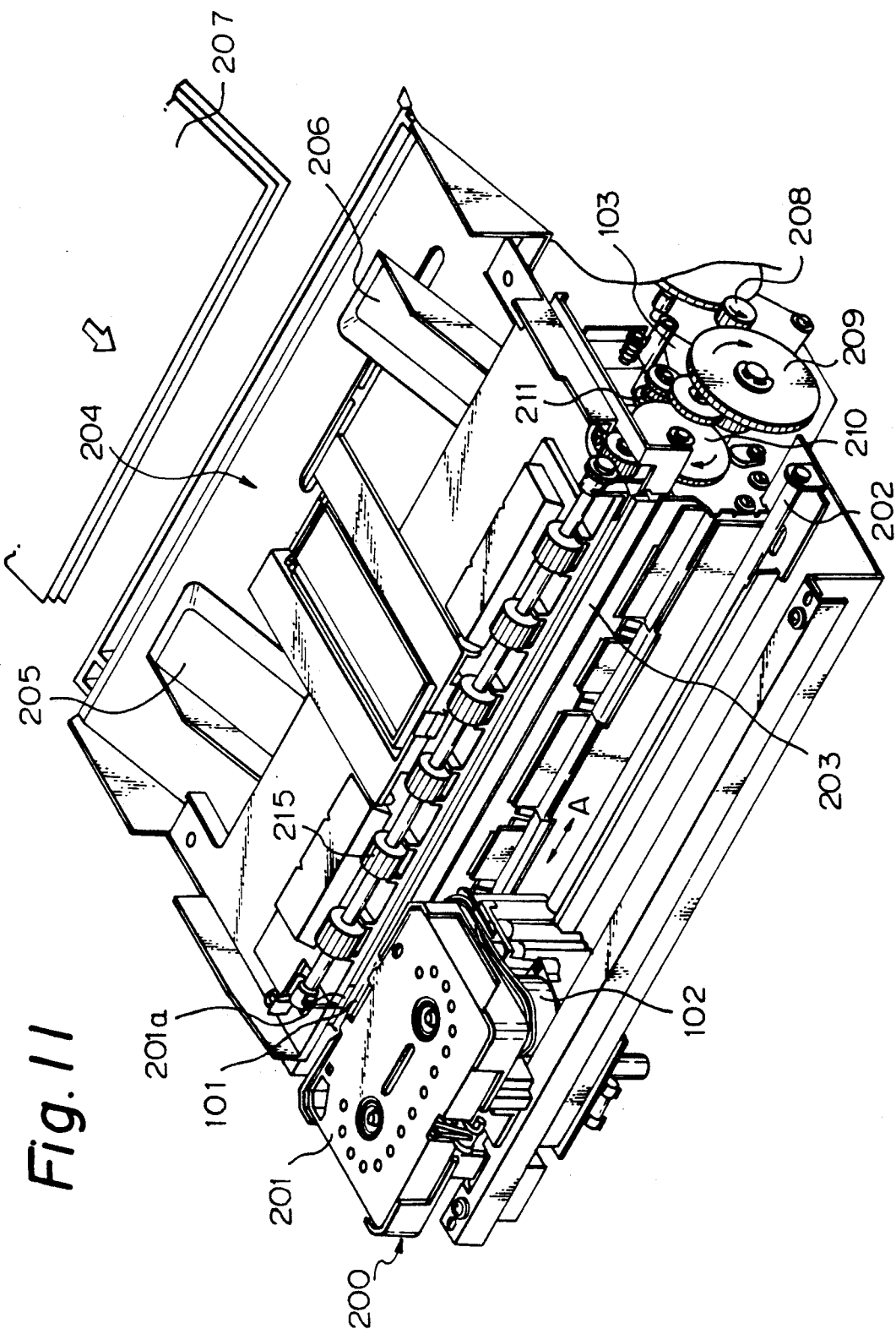
FIG. 11 is a perspective view of the mechanism of the second embodiment.
Figure 12:
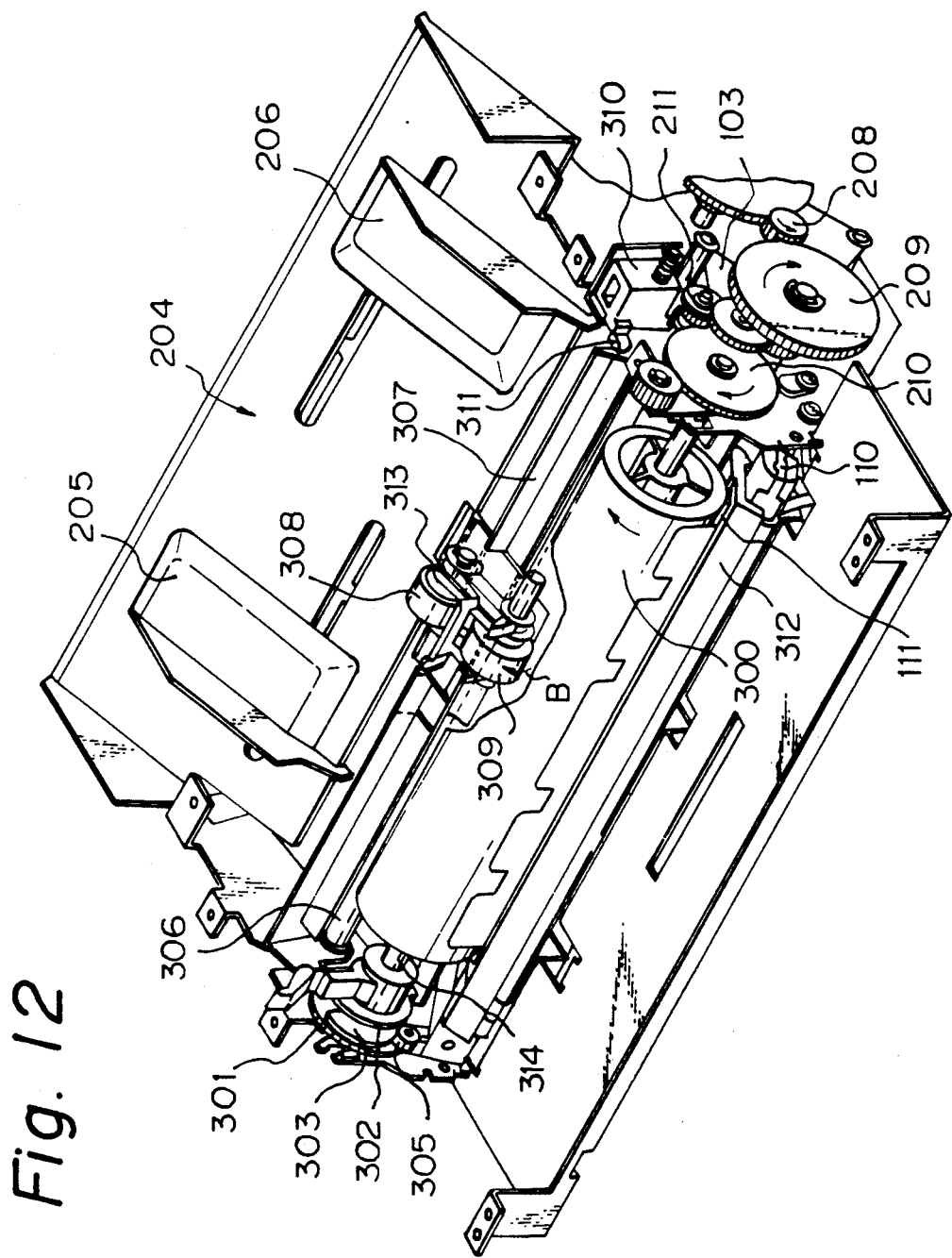
FIG. 12 is a view similar to FIG. 11 illustrating the mechanism of the second embodiment from which a carriage and an upper frame are removed.

FIG. 11 is a partly cut away perspective view of the reader printer from which a cover is removed. FIG. 12 is a partly cut away perspective view showing the mechanism of the reader printer of FIG. 11 from which a carriage and an upper frame are removed. The same elements throughout several views are identified by the same reference numerals.

In FIG. 11, a ribbon cassette 201 accommodating an ink ribbon 201a is carried by the carriage 200. The carriage 200 is reciprocally moved in the directions of a double-headed arrow A substantially parallel to the longitudinal axis of a flat platen 203 along a shaft 202 by the motion of a carriage motor 102. The flat platen 203 made of a soft material such as rubber is disposed in face-to-face relationship with the thermal head 101 carried by the carriage 200. A recording sheet 207 is fed to the gap between the ink ribbon 201a and the flat platen 203 by the motion of the sheet feed motor 103, and the thermal head 101 is pressed into contact with the recording sheet 207, thus effecting transfer recording on the recording sheet 207 as the carriage 200 moves.

A sheet storage portion (stacker) 204 is capable of storing a plurality of sheets 207 such as recording sheets or originals to be read. The stacker 204 is provided with slidable sheet guide members 205 and 206, and an operator can adjust the respective positions of these members 205 and 206 in accordance with the size of the sheet 207. The respective position of the sheet guide members 205 and 206 are detected by a sensor (not shown). The control unit 100 receives a signal from the sensor to detect the size of the sheet 207 stored in the storage portion 204.

A gear 208 is attached to the output shaft of the sheet feed motor 103. As the gear 208 rotates in the direction indicated by an arrow, this rotation is transmitted through gears 209 and 210 to a platen (main roller) and a sheet feed roller both of which will be described later. Thus the platen and the roller are driven to feed the sheet 207. In FIG. 11, reference numeral 215 represents discharge rollers.

The operation of the aforesaid mechanism will be described in more detail below with reference to FIGS. 12 and 13.

Referring to FIG. 12, the rotational force of the sheet feed motor 103 is transmitted to the gear 210 attached to a shaft 314 to cause a platen (main roller) 300 to rotate about the axis of the shaft 314. Cams 302 and 303 are supported for rotation about the shaft 314 of the platen 300, and are rotated by the pick-up motor 104 irrespective of the movement of the platen 300. The cams 302 and 303 are integral with a gear 301, and, as the rotational force of the pick-up motor 104 is transmitted to the gear 301, the cams 302 and 303 are interlockingly rotated.

The cam 303 is engaged with a cam follower 305 attached to a contact sensor 312 which carries the read sensor 111 and the lamp 110. Therefore, as the cam 302 rotates, the contact sensor 312 is capable of moving up and down. Similarly, the cam 302 is engaged with a cam follower attached to a lever 307. A pick-up roller 308 is moved up and down by rotating the lever 307 about the axis of a shaft 306.

As described previously, the contact sensor 312 having the lamp 110 and the read sensor 111 is adapted to move into contact with the platen 300 (the down position) and to move away therefrom (the up position). During reading, the contact sensor 312 is maintained at the down position, and light emanating from the lamp 110 is reflected from the surface of the sheet 207 (e.g., an original to be read) and the light thus reflected is received by the read sensor 111 to be converted into an electrical signal.

A separation roller 309 is rotatably fitted onto the shaft 306 of the lever 307. When the pick-up roller 308 is located at the down position (that is, the roller 308 is pressed in contact with the sheet 207), the rotational force of the sheet feed motor 103 is transmitted to the shaft 306 through the gears 208 and 211 to cause the roller 306 to rotate in the direction of an arrow B. The rotation of the separation roller 309 is transmitted through a belt 313 to the pick-up roller 308 to cause the sheet 207 to be fed from the stacker 204.

When the pick-up roller 308 is located at the up position (that is, the pick-up roller 308 is retracted from the sheet), the shaft 306 is separated from the gear 211 and thus the rotational force of the sheet feed motor 103 is not transmitted to the shaft 306, with the result that the shaft 306 and the separation roller 309 are allowed to rotate about their respective axes. A switch unit 310 serves as a drive switch unit for controlling the switching of the gear 211 by detecting the position of the lever 307 via a roller 311. This operation will be described in detail later with reference to FIG. 16.

Figure 13A:
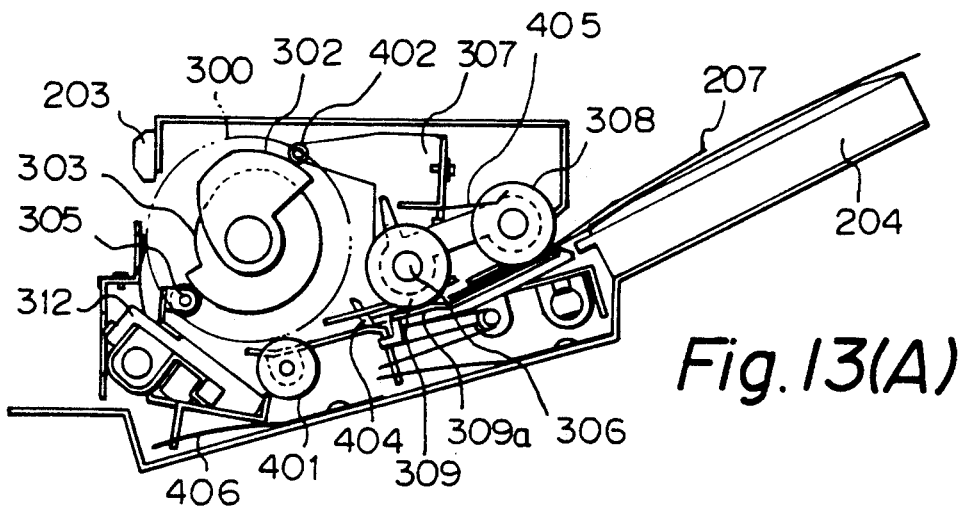
FIGS. 13(A) to 13(C) illustrate variations in the positional relationship between a pick-up roller and a contact sensor in the reader printer shown in FIG. 10.
Figure 13B:
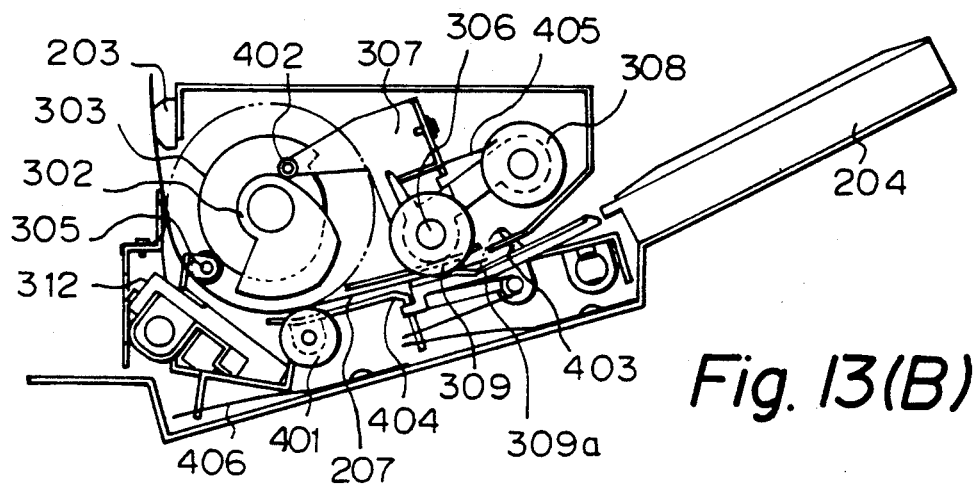
Figure 13C:
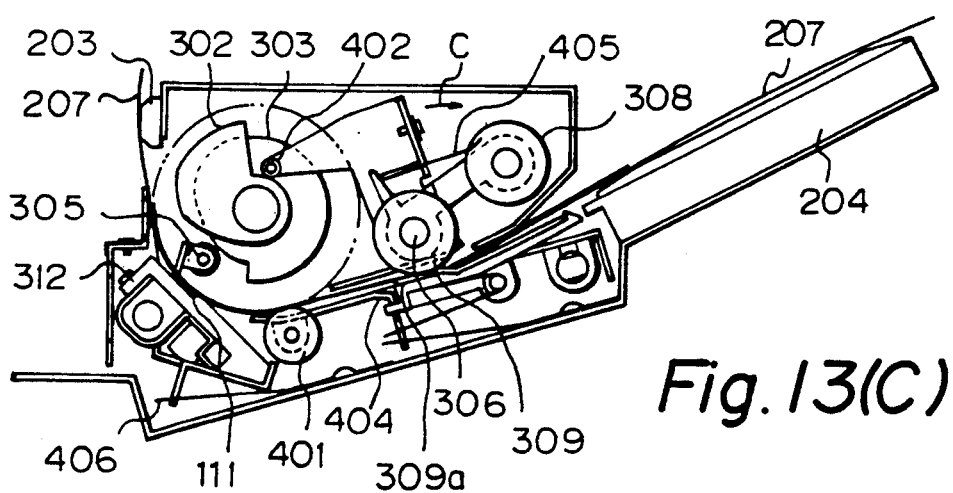

FIGS. 13(A), 13(B) and 13(C) respectively illustrate variations in the relationship between the positions of the cams 302 and 303 and the movement of the pick-up roller 308 as well as the contact sensor 312.

FIG. 13(A) illustrates, the states of the respective components when a stack of sheets 207 has started to be fed from the stacker 204. FIG. 13(B) illustrates the states of the same immediately after a single sheet 207 has been fed or while the thermal head 101 is performing a recording operation. FIG. 13(C) illustrates the state of the pick-up roller 308 and the contact sensor 312 while an original is being read or in a standby state of the illustrated mechanism.

In the standby state, the pick-up roller 308 is normally lifted up as shown in FIG. 13(C), and the contact sensor 312 is pressed in contact with the platen 300 by a leaf spring 406 (a down state). Thus lowering of the efficiency of the read sensor 111 can be inhibited by shielding the read sensor 111 to prevent incident light from entering. In this state, the sheets 207 are set on the stacker 204 and, when a sheet feed command is issued, the cams 302 and 303 are rotated counterclockwise. In consequence, the cam 302 and the cam follower 402 provided on the lever 307 assume the positional relationship shown in FIG. 13(A). In FIG. 13(A), the lever 307 pivots on the shaft 306 from its position in FIG. 13(C) in the direction indicated by an arrow C, and the pick-up roller 308 is pressed in contact with the stack of sheets 207 by a leaf spring 405. In the meantime, the contact sensor 312 is moved away from the platen 300 to prevent the surface of the read sensor 111 from being worn by contact with the platen 300 when it is rotating.

In the state shown in FIG. 13(A), the leading end of the stack of sheets 207 is inserted to a position downstream of the separation roller 309, and a sheet sensor 403 is ON. In this state, when the sheet feed motor 103 starts to rotate, the rotational force of the sheet feed motor 103 is transmitted to the shaft 306 and the platen 300. As the shaft 306 rotates, the separation roller 309 rotates. The rotation of the separation roller 309 is transmitted to the pick-up roller 308 through the belt 313. In this manner, the stack of sheets 207 is fed to the gap between the separation roller 309 and a separation plate 309a facing the roller 309, and a single sheet 207 is separated from that stack. Subsequently, when the thus-separated sheet 207 moves, a sheet sensor 404 provided at an intermediate position between the a roller 401 and the separation roller 309 is turned on.

When the sheet 207 is inserted into the nip between the platen 300 and the roller 401, as shown in FIG. 13(B), the cams 302 and 303 rotates to allow the pick-up roller 308 to be moved up by the force of a spring (not shown), whereby the sheets 207 stored in the stacker 204 are prevented from being continuously fed. Thus, the sheets 207 are positively fed in a one-by-one fashion and are subjected to a predetermined process such as reading or recording.

FIG. 13(B) illustrates the recording operation of the thermal head 101. In this case, the sheet 207 is nipped between the platen 300 and the roller 401, and is fed forward by the rotation of the platen 300 in synchronization with the movement of the carriage 200.

On the other hand, in an original reading operation, as shown in FIG. 13(C), the contact sensor 312 is pressed in contact with the platen 300 with the original interposed therebetween, and the original is fed by the rotation of the platen 300 in synchronization with the operation of reading the original The roller 401 is a rotatable pinch roller which is pressed against the platen 300 and is rotated in interlocking relationship with the rotation of the platen 300.

Where the thermal head 101 effects recording on the sheet 207 fed from the stacker 204, the pick-up roller 308 and the contact sensor 312 are positioned as shown in FIG. 13(B). Where reading from the sheet 207 is effected, the contact sensor 312 is moved down, that is, pressed into contact with the platen 300 as shown in FIG. 13(C). In this manner, recording on or reading from a single sheet 207 is completed.

When the next sheet feed command is issued, the pick-up roller 308 and the contact sensor 312 are positioned as shown in FIG. 13(A), and the next single sheet 207 is fed from the stacker 204 in the above-described manner.

Figure 14:
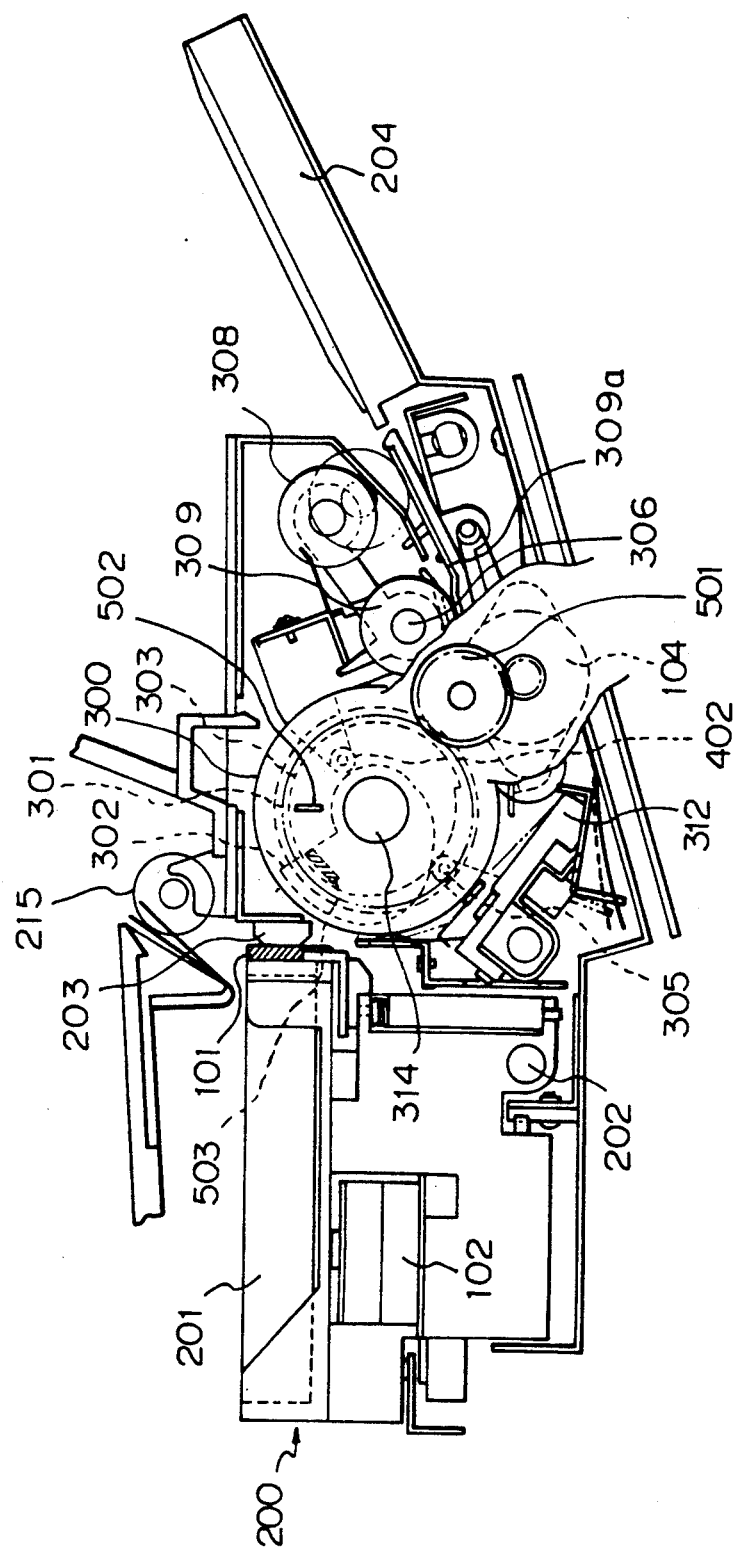
FIG. 14 is a diagrammatic, longitudinal section of the reader printer constituting the second embodiment.

FIG. 14 is a diagrammatic longitudinal section of the structure of the reader printer constituting the second embodiment.

As illustrated, the carriage 200 carries the ink ribbon cassette or cartridge 201, the carriage motor 102, the thermal head 101 and so forth. The carriage 200 moves along the longitudinal axis of the shaft 202 (that is, in a direction perpendicular to the surface of the sheet of FIG. 14) to effect sequential printing. The cams 302, 303 and the gear 301 causing upward and downward movement of each of the pick-up roller 308 and the contact sensor 312 are supported for pivotal movement about the rotary shaft 314 of the platen 300.

The pick-up motor 104 and a gear 501 are provided on the left-hand side of the reader printer, as viewed in, for example, FIG. 12 (on the reverse side as viewed in FIG. 5). The rotational force of the pick-up motor 104 is transmitted to the gear 301 through the gear 501. The gear 301 is integral with the cams 302 and 303 and therefore the rotation of the gear 301 is converted directly into the rotation of the cams 302 and 303. A projection 503 is formed on a portion of the gear 301. The projection 503 engages with a stopper 502 provided on a side frame to prevent the gear 301 from rotating through a specified angle or greater (for example, about 315 degrees in the second embodiment).

Thus, the pick-up roller 308 and the contact sensor 312 are displaced in the manner shown in Figs. 13(A) to 13(C).

Figure 15:
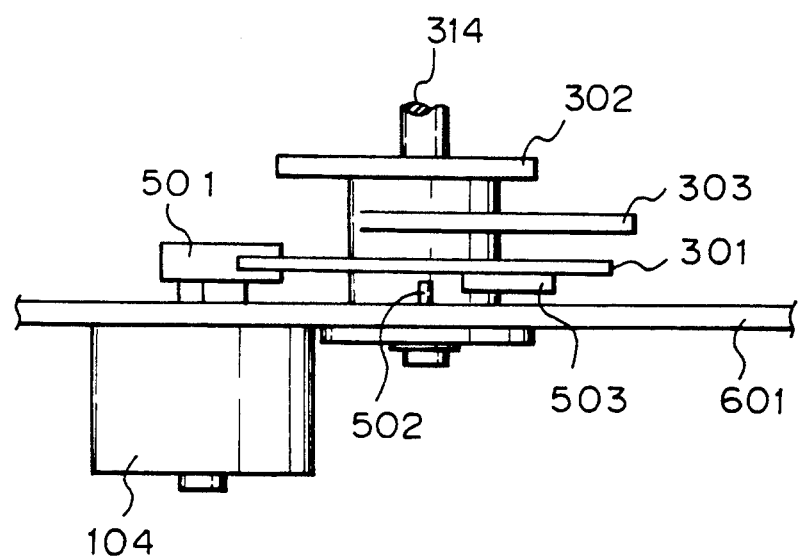
FIG. 15 is a top plan view of a cam assembly incorporated in the second embodiment.

FIG. 15 is a diagrammatic top plan view of the gear 301 and the cams 302, 303.

As illustrated, the pick-up motor 104 is fixed to a side frame 601. The rotational force of the pick-up motor 104 is transmitted to the cams 302 and 303 through the gears 501 and 301. These cams and the gear 301 are pivotable independently of the rotation of the shaft 314.

The projection 503 is provided on the gear 301, and the stopper 502 fixed to the side frame 601 engages with the projection 503 to restrict the rotation range of the gear 301.

Figure 16:
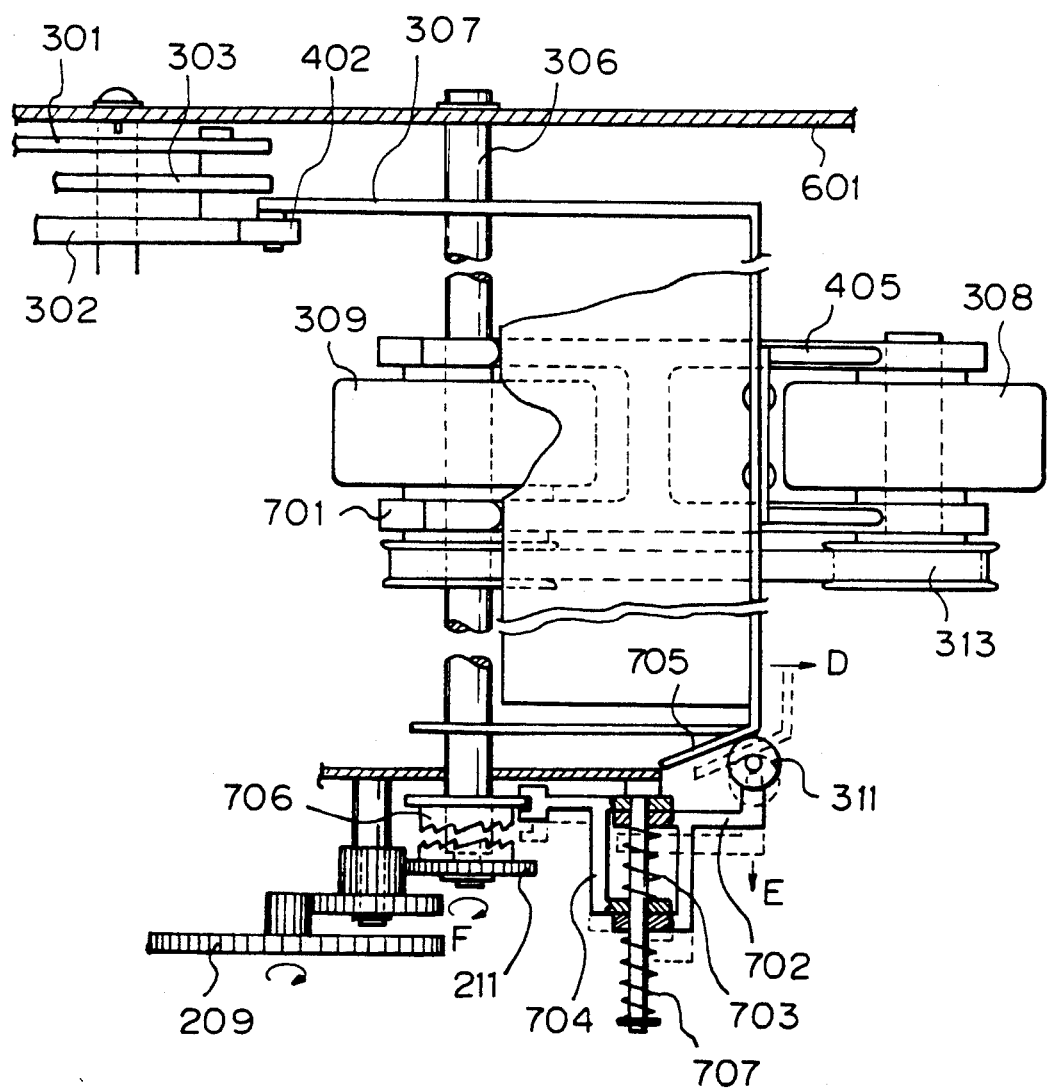
FIG. 16 is a diagrammatic top plan view, partially cut away, of a drive switch unit for switching the transmission of a rotational drive to the pick-up roller in the second embodiment.

Drive Switch Unit for Pick-up Roller 308 (FIG. 16)

FIG. 16 is a diagrammatic top plan view, partially cut away, of the drive switch unit for switching the transmission of the rotational drive to the pick-up roller 308.

Referring to FIG. 16 which illustrates a state wherein the pick-up roller 308 is lifted up, the pick-up roller 308 is rotated in an arc about the axis of the separation roller 309 via a linkage member 710 in accordance with the movement of the lever 307. As the cam 302 rotates, the lever 307 is pivoted on the shaft 306 by the movement of the cam follower 402 (the state shown in FIG. 13(A)) and thus the lever 307 is caused to move in the direction indicated by an arrow D of FIG. 16. In consequence, the pick-up roller 308 is pushed downwardly by the leaf spring 405.

Simultaneously, the roller 311 is pushed by a slant portion 705 of the lever 307 to cause a member 702 to move in the direction indicated by an arrow E. The movement in the direction of the arrow E is transmitted to the member 704 by a spring 703. In this manner, a clutch gear 706 is moved in the direction of the arrow E and engages with the gear 211, and the rotational drive of the sheet feed motor 103 in the direction of the arrow F is transmitted to the shaft 306 and the separation roller 309 as well as to the pick-up roller 308 through the belt 313. The gear clutch 706 is arranged to transmit the rotation in the direction of the arrow F only.

On the other hand, in either state other than that of FIG. 13(A) (when the pick-up roller 308 is not located at the down position), the lever 307 and the roller 311 stop as shown in FIG. 16. The member 702 is urged by a spring 707 to move in the direction opposite to the direction of the arrow E. Thus the engagement between the gear 211 and the clutch gear 706 is released and thus the rotational force of the sheet feed motor 103 is not transmitted to the shaft 306. Therefore, the shaft 306 is allowed to independently rotate about its axis.

Figure 17B:
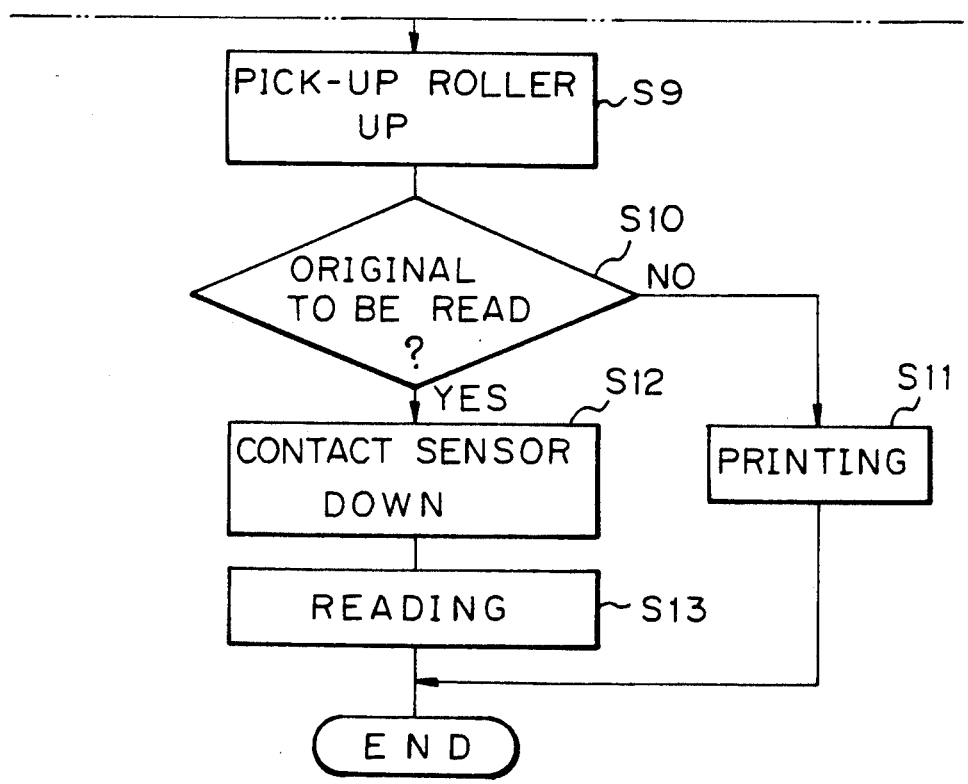
FIG. 17 is a composed of FIGS. 17(A) and 17(B) and is a flow chart showing the operation sequence of the reader printer constituting the second embodiment.

Operation (FIGS. 13 and 17)

FIG. 17 is a flow chart showing the operation of the reader printer constituting the second embodiment. A program employed for executing the operation of the present embodiment is stored in a ROM of the control unit 100.

Before the operation starts, the contact sensor 312 is maintained at a down position at which it is pressed in contact with the platen 300 while the pick-up roller 308 is lifted up, as shown in FIG. 13(C). The program is started by entering an original read command or a print command through external equipment or an operation panel (neither of which are shown).

First, judgement is made (Step S1) as to whether or not the sheet sensor 403 is ON. If the sensor 403 is OFF, "SHEET ABSENCE ERROR" is displayed (Step S2). If the sensor is ON, the process proceeds to Step S3, in which the cams 302 and 303 are rotated counterclockwise by the motion of the pick-up motor 104 to cause the pick-up roller 308 to move downwardly and the contact sensor 312 to move away from the platen 300. Thus the state of FIG. 13(C) proceeds to the state of FIG. 13(A). In Step S4, the sheet feed motor 103 is driven to start the feeding of the sheets 207 stacked in the stacker 204. In Step S5, judgement is made as to whether or not the sheet sensor 404 is turned on. If the sheet sensor 404 is not yet turned on after a predetermined period has passed (Step 6), the process proceeds to Step 7, in which a predetermined error processing step is executed, such as the elimination of a sheet jam.

If the sheet sensor 404 is turned ON (Step S5), the process proceeds to Step S8, in which the process waits for a period required for one of the sheets 207 to be nipped between the platen 300 and the roller 401. The sheet 207 is inserted into the nip between the platen 300 and the roller 401 and thus the sheet 207 is able to be fed by the cooperation of the platen 300 and the roller 401. In this state, the process proceeds to Step S9, in which the pick-up roller 308 is lifted up as shown in FIG. 13(B). Thus the next sheet 207 is prevented from be fed from the stacker 204.

A decision is made (Step S10) as to whether an original should be read or recording should be performed by the thermal head 101. If the recording is selected, the sheet 207 is fed to the flat platen 203 and the carriage 200 is scanned to effect recording.

On the other hand, if the reading is selected (Step S10), the process proceeds to Step S12, in which the contact sensor 312 is moved to a down position at which the read sensor 111 is pressed in contact with the sheet 207 (FIG. 13(C)). Then the original is read (Step S13).

It is to be noted that, during reading or printing, the feeding of the sheet 207 is stopped as required while one line of information is being read or printed.

As is evident from the foregoing, in the second embodiment, one feed passage can be employed in common as the feed passage for allowing the recording sheet to be fed therethrough and the feed passage for allowing the original to be fed therethrough and, in addition, the read sensor unit can also be used as a sheet guide Accordingly, the second embodiment produces an effect upon reductions in the size of the reader printer and the production cost thereof.

In addition, each time one sheet is fed from the stacker, the pick-up roller is lifted up so that the sheets are effectively prevented from being continuously fed from the stacker.

The structure of the second embodiment will be described in further detail below with reference to FIGS. 13 to 22. In the following description, now reference numerals are used to denote like or corresponding elements relative to those which have been described above.

Overall Construction

The overall construction of the second embodiment will be described below with reference to FIG. 18 which is a partially broken away perspective view showing a typical example of the reader and printer mechanism.

Figure 18:
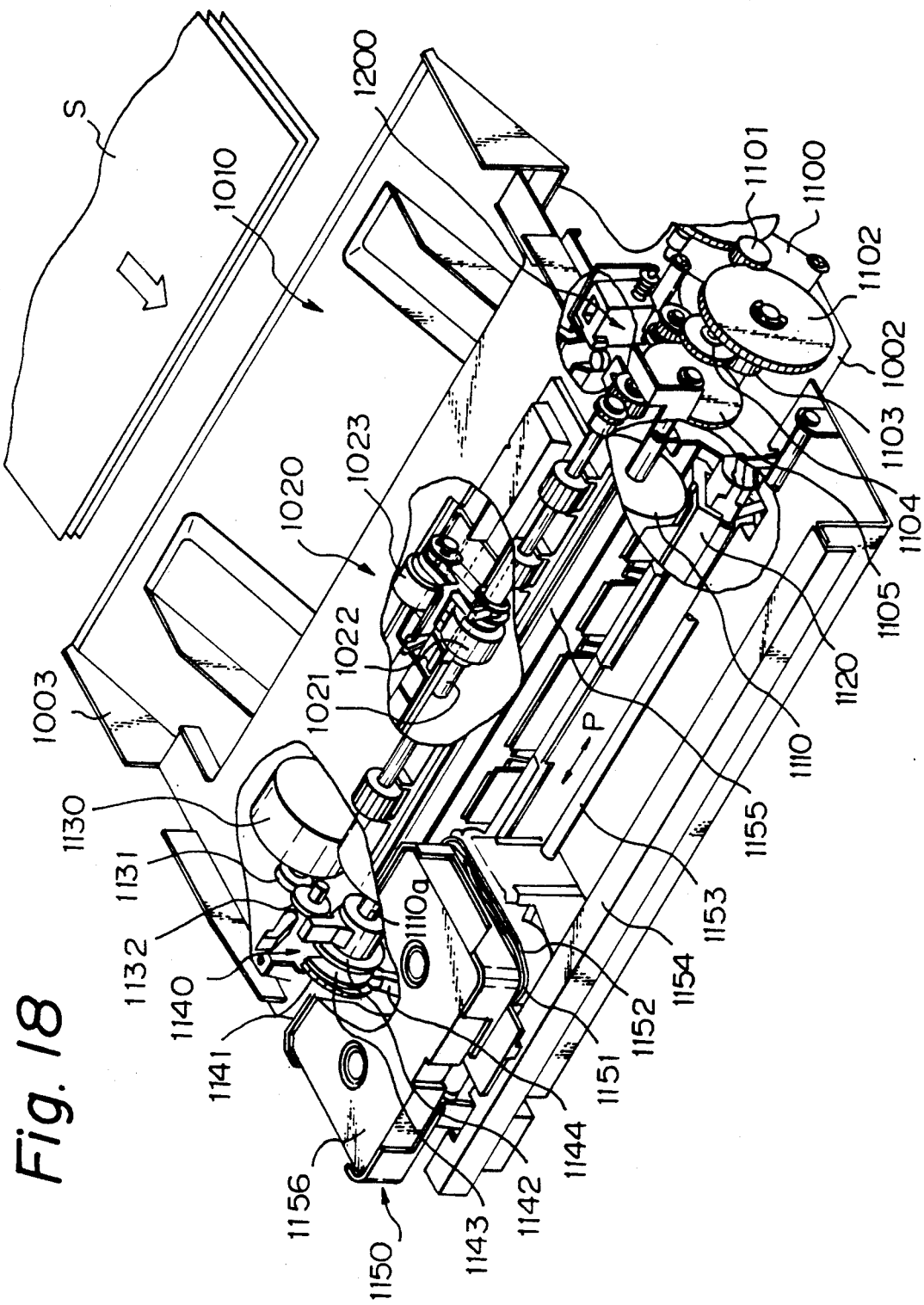
FIG. 18 is a partially broken away perspective view of the reader/recorder mechanism of the second embodiment.

In FIG. 18, a storage section 1010 capable of storing a plurality of sheets such as originals or recording sheets is provided at the rear of the body of the embodiment.

A first motor 1100 is attached to a right side plate 1002 of the body while a second motor 1130 is attached to a left side plate 1003. A main roller 1110 is pivotably supported by bearings provided at the right and left side plates 1002 and 1003. The rotational force of the first motor 1100 is transmitted to the main roller 1110 through transmission gears 1101, 1102, 1103, 1104, and 1105.

A cam assembly 1140 is rotatably supported by a shaft 1110a of the main roller 1110, and is constituted by an integral combination of a cam transmission gear 1141, a first cam plate 1142, and a second cam plate 1143. The rotational force of the second motor 1130 is transmitted to a cam assembly 1140 through cam transmission gears 1131 and 1132.

A thermal transfer printer mechanism indicated generally at 1150 is provided at the front of the body, and a platen plate 1155 serving as a printing platen is fixed to the body and is located at a position above the main roller 1110. The thermal transfer printer mechanism 1150 includes a carriage 1151 having a motor 1152 the rotary shaft of which is provided with a pinion gear (not shown) which is meshed with a rack (not shown) attached to the body to allow the carriage 1151 to move in the directions indicated by a double-headed arrow p along a carriage shaft 1153 and a slide surface 1154 which cooperate with each other to serve as a guide member. A thermal head (not shown in FIG. 18) is carried on the carriage 1151 (the thermal head is shown in FIGS. 1, 3 to 11, and 14.) The thermal transfer printer mechanism 1150 further includes a thermal-head positioning mechanism (not shown) which is arranged to, for printing, press the thermal head in contact with the platen plate 1155 and, for non-printing, to space the thermal head apart from the same. A ribbon cartridge 1156 is replaceably set on the carriage 1151. A ribbon feed mechanism and the motor 1152 employ an electric power source in common.

A contact-type line image sensor 1120 serving as read means is disposed at a position below the main roller 1110 for pivotal movement about a bearing member attached to the body so that the image sensor 1120 is capable of moving toward and away from the main roller 1110. A second cam follower roller 1144 integral with the contact-type line image sensor 1120 is adapted to be pressed against the second cam plate 1143. This arrangement allows the sensor 1120 to be pressed against and moved away from the main roller 1110 in accordance with the rotary motion of the second cam plate 1143.

A roller assembly indicated generally at 1020 is disposed above a position downstream of the sheet storage section 1010, and is supported for pivotal movement about a roller shaft 1021 journaled by bearings attached to the right side plate 1002 and the left side plate 1003 of the body. (These bearings will be described in detail later.)

The rotational force of the first motor 1100 is transmitted to the roller shaft 1021 through an engagement means 1200 which will be described later.

Construction and Operation of Roller Assembly 1020

First, the construction of the roller assembly 1020 will be described below with reference to FIGS. 20 and 21.

Figure 21:
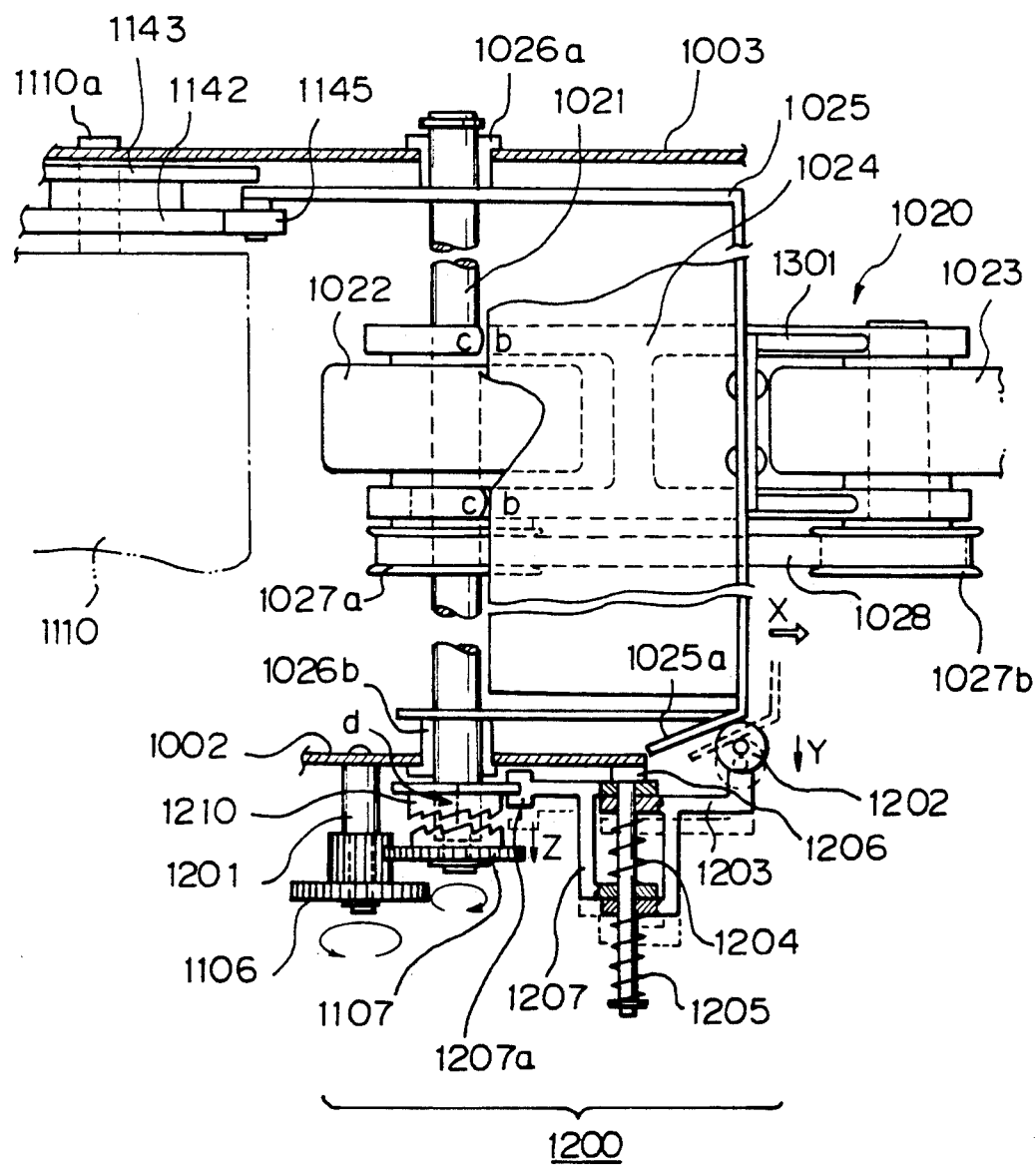
FIG. 21 is a diagrammatic top plan view illustrating engagement means incorporated in the reader printer FIG. 18.

Referring to FIG. 21, the roller shaft 1021 is rotatably supported by bearings 1026a and 1026b fixed to the right and left side plates 1003 and 1002, respectively, and a frame 1024 of the roller assembly 1020 is rotatably supported by the roller shaft 1021. A separation roller 1022 and a pick-up roller 1023 are rotatably supported by bearings (not shown) provided in the frame 1024, and these rollers 1022 and 1023 each have a surface made of a material, such as a rubber, having a high friction coefficient. In this case, the frame 1024 and the separation roller 1022 rotate about a common axis, that is, the roller shaft 1021. The separation roller 1022 integral with a timing pulley 1024a is fixed to the roller shaft 1021. The pick-up roller 1023 integral with a timing pulley 1027b is pivotably supported by the bearings in the frame 1024. The timing pulleys 1027a and 1027b are connected by a timing belt 1028 for synchronous rotation about their respective axes. Therefore, when a rotational force is transmitted to the roller shaft 1021 through an engagement means 1200 which will be described later, the separation roller 1022 and the pick-up roller 1023 are rotated in synchronization with each other.

The second embodiment will be further described with reference to FIG. 20 which is an essential longitudinal section of the second embodiment.

Figure 20:
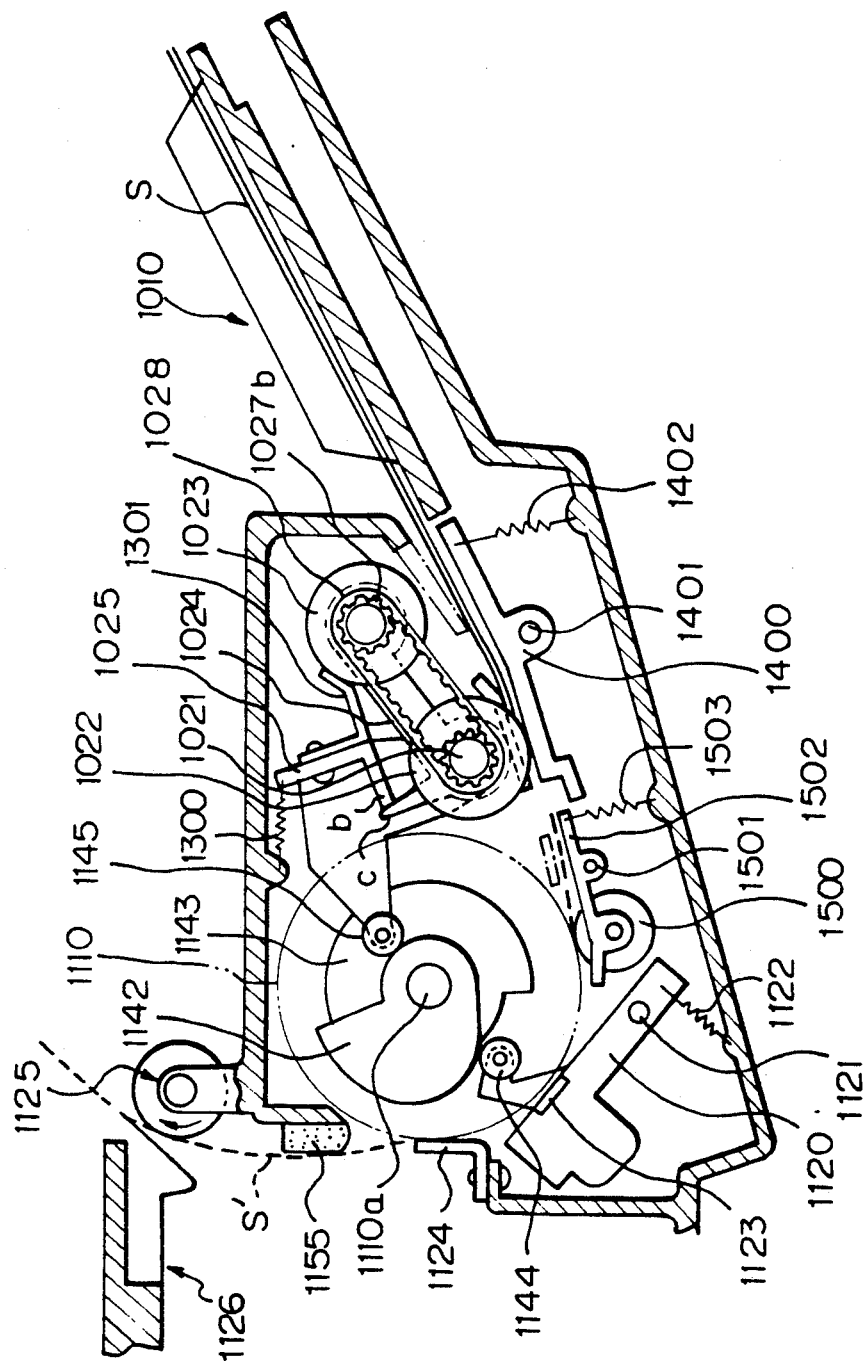
FIG. 20 is an enlarged longitudinal view of a portion of the reader printer shown in FIG. 18.

As shown in FIG. 20, the pick-up lever 1025 pivots on the roller shaft 1021. The end of the pick-up lever 1025 adjacent to the left side plate 1003 is provided with a rotatable cam follower 1145 which is adapted to be pressed against the first cam plate 1142 by the tension of a coiled spring 1300. Accordingly, when the first cam plate 1142 rotates and a small-diameter portion of the first cam plate 1142 is brought into contact with the cam follower 1145, a portion b of the pick-up lever 1025 is brought into contact with a portion c of the frame 1024. On the other hand, when the first cam plate 1142 rotates and a large-diameter portion of the first cam plate 1142 is brought into contact with the cam follower 1145, a leaf spring 1301 fixed to the pick-up lever 1025 is pressed in contact with the frame 1024.

Figure 19A:
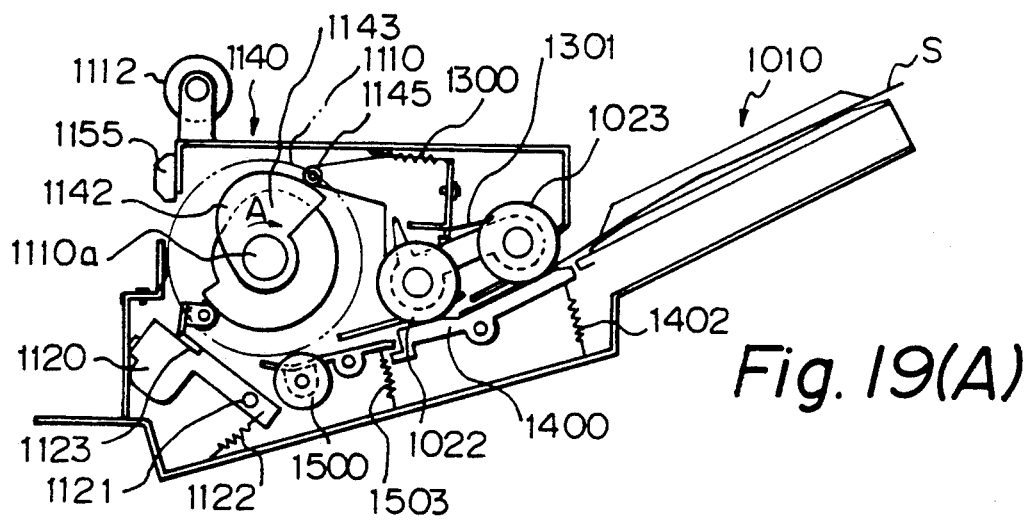
FIGS. 19(A) to (C) illustrates the operation of a cam assembly in the reader printer shown in FIG. 18.

Therefore, when the cam follower 1145 is brought into contact with the large-diameter portion of the first cam plate 1142, the leaf spring 1301 is pressed against the frame 1024 as shown in FIG. 19(A). Thus a pick-up roller 1023 is pressed in contact with a stack of sheets S such as originals or recording sheets, thereby producing a pressure acting to feed the sheet S. A separation plate 1400 is disposed in face-to-face relationship with the roller assembly 1020 for pivotal movement about a separation-plate shaft 1401 integral with the body. The separation plate 1400 is maintained in contact with the separation roller 1022 by the tension of a coiled spring 1402 having one end connected to the body and the other end connected to the separation plate 1400.

As described above, the separation plate 1400 and the roller assembly 1020 including the separation roller 1022 and the pick-up roller 1023 constitute in combination a sheet feed mechanism for sequentially feeding each of a plurality of sheets, such as the ADF (auto document feeder) and the ASF (auto sheet feeder) a mechanism will be briefly explained. If $\mu_1$ represents the friction coefficient between the separation plate 1400 and the sheet S, $\mu_2$ the friction coefficient between the sheets S and $\mu_3$ the friction coefficient between the separation roller 1022 and the sheet S, only the uppermost one of the stack of sheets S can be fed by maintaining the relationship of $\mu_3 > \mu_2 > \mu_1$. More specifically, in the aforesaid state wherein the cam follower 1145 is pressed in contact with the large-diameter portion of the first cam plate 1142, the roller assembly 1020 assumes the state shown in FIG. 19(A) to allow a rotational force to be transmitted to the pick-up roller 1023 and the separation roller 1022 through the engagement means 1200 which will be described later. Thus only one sheet S is fed by the effect of $\mu_3$ which is the highest friction coefficient of the three.

Construction and Operation of Engagement Means
1200

The rotational force applied to the separation roller 1022 and the pick-up roller 1023 is supplied from the first motor 1100 through the engagement means 1200. It is therefore unnecessary to provide any dedicated electrical power source for each of these rollers 1022 and 1023.

Referring to FIG. 21, a stud 1201 is disposed upright on the right side plate 1002, and an idle gear 1106 is rotatably supported by the stud 1201. The idle gear 1106 is in turn meshed with the first motor 1100 (not shown in FIG. 21 but shown in FIG. 18). The idle gear 1106 is further meshed with a clutch gear 1107 which is rotatably supported by the roller shaft 1021. In the state shown in FIG. 21, when the first motor 1100 is in motion, the idle gear 1106 is meshed with the clutch gear 1107 in an idling manner.

A clutch stud 1206 is disposed upright on the right side plate 1002, and a clutch 1203 and a clutch 1207 in combination are fitted onto the clutch stud 1206 for sliding movement along the longitudinal axis of the stud 1206 without being rotatable about the same. A compression spring 1204 is fitted onto the portion of the stud 1206 which is axially defined between opposing inner surfaces of the clutch 1203 and the clutch 1207. One end of the compression spring 1204 is pressed against the inner surface of the clutch 1200 while the other end is pressed against the inner surface of the clutch 1207. A compression spring 1205 is fitted onto the portion of the clutch stud 1206 which is axially defined between the free end of the stud 1206 and the outer surface of the clutch 1203 which is nearest the same, and this outer surface is pressed by the compression spring 1205. One end of the clutch 1203 has a clutch roller 1202 rotatably supported thereon.

A transmission portion such as a spline for transmitting a rotational force is provided on a part d of the roller shaft 1021, and a clutch gear 1210 is axially slidably fitted onto this transmission portion. The clutch gear 1210 has a flange portion, which engages with a recessed portion 1207a formed in one end of the clutch 1207. A slant portion 1025a formed at a portion of the pick-up lever 1025 is normally maintained in contact with the aforementioned clutch roller 1202.

The following is a description of the operation of the clutch engagement means 1200 having the above-described construction. When the cam follower 1145 is pressed into contact with a large-diameter portion of the first cam plate 1142, the pick-up lever 1025 is rotated in the direction indicated by an arrow X. In this case, the clutch roller 1202 in contact with the slant portion 1025a is moved in the direction indicated by an arrow Y, and is located at a position shown by broken lines in FIG. 21.

The clutch 1203 acts to compress the compression spring 1204 and thus the clutch 1207 is moved in the direction indicated by an arrow Z. The recessed portion 1207a of the clutch 1207 in turn acts to engage the clutch gear 1210 with the clutch gear 1107. As described previously, a rotational force has been transmitted to the clutch gear 1107, with the result that this rotational force is transmitted to the roller shaft 1021 through the engagement between the clutch gears 1210 and 1107. In other words, rotation of the first cam plate 1142 causes the engagement operation of the engagement means 1200 to allow the rotational force of the first motor to the roller shaft 1021.

Construction and Operation of Main Roller 1110

Referring to FIG. 20, a pinch roller 1500 is disposed at a position below the main roller 1110. The pinch roller 1500 is rotatably supported by one end of an arm 1502, and is normally pressed in contact with the main roller 1110 at the lower portion thereof by the tension of an arm spring 1503 which is tensely disposed between the other end of the arm 1502 and a predetermined portion of the body of the reader printer. As described previously in the Overall Construction discussion, a read sensor 1120 is pressed in contact with the main roller 1110. More specifically, a read unit 1123 is adapted to abut against the main roller 1110 and also to serve to conduct the sheet S upwardly while being maintained in contact with the main roller 1110.

A leaf-spring guide 1124, which is fixed to the body, is adapted to be pressed in contact with the main roller 1100 by its own resilient force. A discharge roller 1125 is rotatably supported on the top of the body, and the rotational force of the first motor 1100 is transmitted to the discharge roller 1125 through a transmission means (not shown). A stabilizer spring 1126 is disposed at a portion opposing the discharge roller 1125.

The main roller 1110 having the above construction feeds a sheet S' shown by a dashed line in FIG. 20. The sheet S' is fed by a drive force which is applied thereto at the following four points: a contact point on the pinch roller 1500, one on the sensor 1120, and one on the leaf-spring guide 1124, as well as one between the discharge roller 1125 and the stabilizer spring 1126. The main roller 1110 also serves as a platen for the read sensor 1120. Accordingly, the main roller is preferably made of a white resilient material if use of a transparent original such as an OHP sheet is taken into account.

Construction and Operation of Cam Assembly 1140

As described previously under the heading Overall Construction with reference to FIG. 18, the cam assembly 1140 is rotatably supported by the shaft of the main roller 1110.

Figure 22:
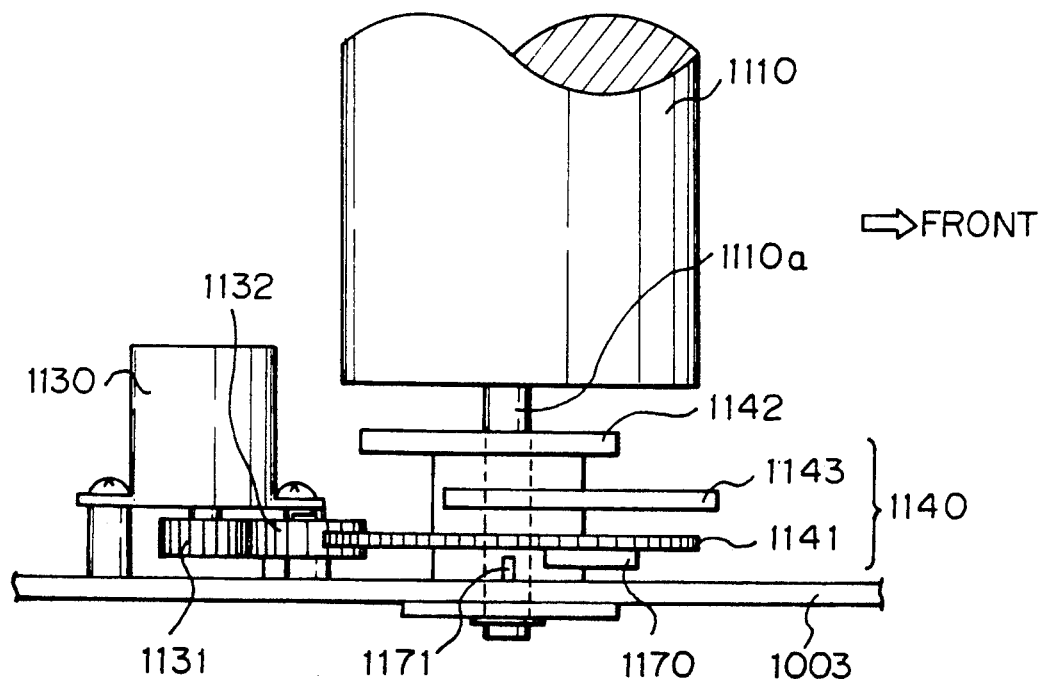
FIG. 22 is a diagrammatic top plan view illustrating the cam assembly used in the reader printer shown in FIG. 18.

Referring to FIG. 22 which illustrates the details of the cam assembly 1140, a cam stopper 1170 is provided at a portion of a cam gear 1141 of the cam assembly 1140. The cam stopper 1170 engages with a stopper plate 1171 fixed to a left side plate to restrict the rotation range of the cam assembly 1140. In addition, the cam stopper 1170 and the stopper plate 1171 are utilized to ensure resetting of the initial state of the cam assembly 1140 when the electrical power source (not shown) is turned on. Specifically, the stopper 1170 and the stopper plate 1171 are employed as mechanical sensor means when the second motor 1130 is actuated by a control means (not shown) to bring the cam assembly 1140 into the state shown in FIG. 19(C). The cam assembly 1140 is not provide with any special position detecting means, but the stopper 1170 and the stopper plate 1171 are capable of performing a function substitutive for such means.

The cam assembly 1140 allows the roller assembly 1020 and the sensor 1120 to move in synchronization with each other.

Figure 19B:
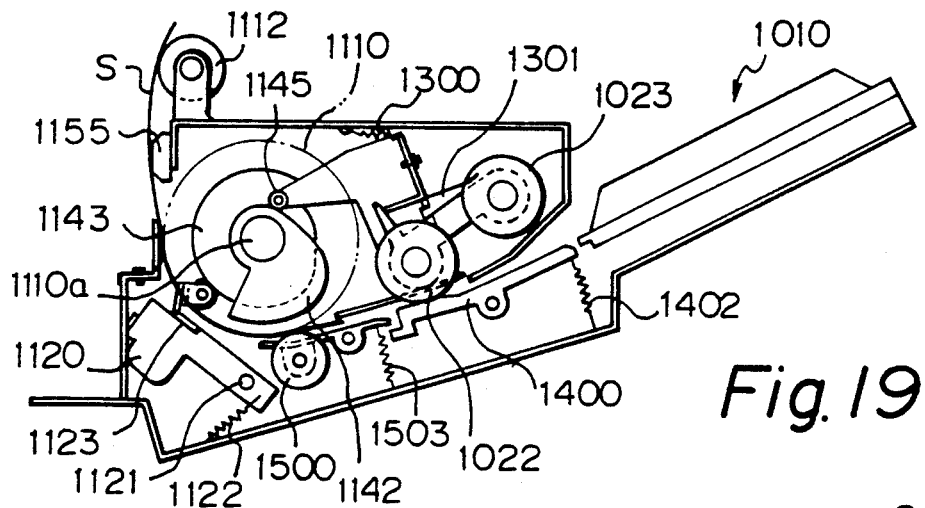
Figure 19C:
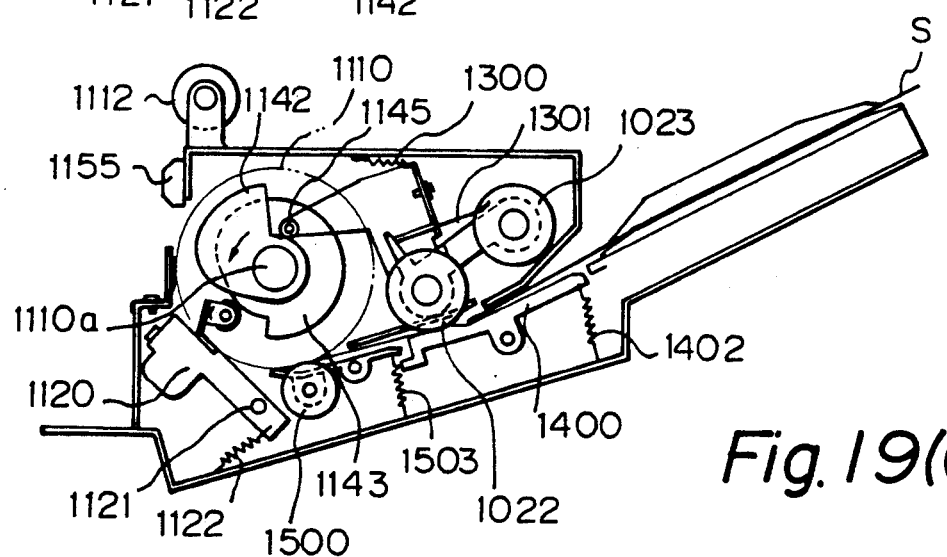

In brief, FIG. 19(C) illustrates the state wherein the cam follower 1145 and the cam follower 1144 are respectively pressed in contact with the small-diameter portions of the first cam plate 1142 and the second cam plate 1143. FIG. 19(B) illustrates the state wherein the cam follower 1144 is pressed in contact with the large-diameter portion of the second cam plate 1143 while the sensor 1120 is spaced apart from the main roller 1110. FIG. 19(A) illustrates the state wherein the cam follower 1145 is pressed in contact with the large-diameter portion of the first can plate 1142 to allow a rotational force to be transmitted to the separation roller and the pick-up roller.

These states and the corresponding states of the sheet S are collectively listed in the following table.

TABLE

| Cam assembly | State of FIG. 19(A) | State of FIG. 19(B) | State of FIG. 19(C) |
| --- | --- | --- | --- |
| Sensor 1120 | Spaced apart from main roller 1110 | Spaced apart from main roller 1110 | Pressed into contact with main roller 1110 |
| Roller assembly 1020 | Pressed into contact with sheet S to allow rotational force of first motor 1 to be transmitted to the same | Pick-up roller is spaced apart from sheet S and thus no rotational force is transmitted to the same | Pick-up roller is spaced apart from sheet S and thus no rotational force is transmitted to the same |
| Sheet S | One sheet S only is fed (in ASF and ADF modes) | * Sheet S is discharged from printer mechanism<br>* Printer mechanism is operation | * Ready/Power Off<br>* Reading of original<br>* Temporary guidance of sheet S in printer mechanism |

It will be appreciated from the foregoing that, in accordance with the present invention, a significantly small drive source and parts can be utilized to constitute a reader/recorder mechanism arranged to employ one common feed passage as a feed passage for a recording sheet and a feed passage for an original to be read, whereby it is possible to provide a reliable and inexpensive structure.

In the second embodiment, a combination of the printer mechanism and the reader mechanism has been described in detail by way of example. However, if a line thermal head is substituted for the line image sensor, the mechanism of the second embodiment can be applied to various other combinations. In addition, the second embodiment can be utilized as apparatus of various types including a sheet feed mechanism.

As will be readily understood from the foregoing, the reader/recorder mechanism constituting the second embodiment is capable of operating in two kinds of modes incorporated in the reader recorder, that is, the recording mode and the reading mode by utilizing a minimum required number of drive sources and parts. It is accordingly possible to provide a reader/recorder mechanism having a compact, inexpensive and reliable structure.

It will be appreciated from the foregoing that the present invention presents an improved reader/recorder capable of properly recording an image on a sheet-like recording medium and properly reading an image from an original.

What is claimed is:

1. An apparatus for reading and recording an image comprising:
   a sheet feed path extending from a sheet inserting section to a sheet exhausting section;

sheet feeding means for feeding a sheet along said sheet feed path;

recording means provided along said sheet feed path for recording an image onto the sheet;

reading means provided along and across said sheet feed path for reading the image recorded on the sheet; and displacing means for displacing said reading means between a reading position where the image is read and a retracted position retractable from said reading position, wherein said reading means is capable of guiding the sheet along the feed path in said retracted position.

2. The apparatus according to claim 1, wherein the sheet is a sheet of recording paper on which an image can be recorded.

3. The apparatus according to claim 1, wherein the sheet is an original having an image to be read.

4. The apparatus according to claim 1, wherein said sheet feeding means is arranged to prohibit feeding of the next sheet after a single sheet has been fed until reading of the image from the single sheet is completed in a reading operation and until recording the image on the single sheet is completed in a recording operation.

5. The apparatus according to claim 1, wherein said image recording means is a serial thermal head.

6. The apparatus according to claim 1, wherein said reading means includes a photoelectric sensor for photoelectrically reading an image from the original.

7. The apparatus according to claim 1, wherein said reading means is a contact-type sensor.

8. The apparatus according to claim 1, wherein said sheet feed path is capable of serving as both a feed path for allowing a sheet of paper for recording an image to be fed therethrough and a feed path for allowing an original for image reading to be fed therethrough.

9. The apparatus according to claim 1, further including a roller member serving as a recording-paper feed roller comprising a part of said recording means during recording and an original read platen comprising a part of said reading means during reading.

10. The apparatus according to claim 1, further including a flat plate serving as a flat platen comprising a part of said recording means during recording and an original read platen comprising a part of said reading means during reading.

11. The apparatus according to claim 1, further including a roller member serving as a platen roller comprising a part of said recording means during recording and an original read platen comprising a part of said reading means during reading.

12. The apparatus according to claim 1, wherein said reading means has a serial sensor.

13. The apparatus according to claim 1, wherein said recording means is located downstream of said reading means with respect to a direction in which the sheet is fed.

14. The apparatus according to claim 1, wherein said recording means is located upstream of said reading means with respect to a direction in which the sheet is fed.

15. An apparatus for reading and recording an image comprising:

a sheet feed path extending from a sheet inserting section to a sheet exhausting section;

sheet feeding means for feeding a sheet along said sheet feed path;

recording means provided along said sheet feed path for recording an image onto the sheet;

reading means provided upstream of said recording means with respect to a feeding direction of the sheet for reading the image recorded on the sheet; and displacement means for displacing said reading means between a reading position for reading an image and a retracted position retractable from said reading position, wherein said reading means is capable of guiding the sheet along the sheet feed path in said retracted position.

16. The apparatus according to claim 15, wherein the sheet is a sheet of recording paper on which an image can be recorded.

17. The apparatus according to claim 15, wherein the sheet is an original having an image to be read.

18. The apparatus according to claim 15, wherein said recording means includes a thermal recording head.

19. The apparatus according to claim 15, wherein said recording mean as is pivotable about a pivot between a printing position and a retracted position.

20. The apparatus according to claim 15, wherein said sheet feeding means includes a feed roller which serves as a platen comprising part of said reading means during reading of an original.

21. An apparatus for reading and recording an image, comprising:

a sheet path through which a sheet passes;

conveying means for conveying the sheet along said sheet path;

recording means provided along said sheet path for recording an image recorded onto the sheet;

reading means provided along and across said sheet path for reading the image recorded on the sheet; and displacing means for displacing said reading means between a reading position where the image is read and a retracted position retractable from said reading position, wherein said reading means is capable of guiding the sheet along the sheet path in said retracted position.

22. An apparatus according to claim 21, wherein the sheet is manually inserted into said sheet path.

23. An apparatus according to claim 21, further comprising automatic sheet feeding means for separating a sheet from a stack of sheets and feeding it to the sheet path.

24. The apparatus according to claim 21, wherein the sheet is a sheet of recording paper on which an image can be recorded.

25. The apparatus according to claim 21, wherein the sheet is an original having an image to be read.

26. The apparatus according to claim 21, wherein said conveying means is arranged to prohibit feeding on the next sheet after a single sheet has been fed until reading of the image from the single sheet is completed in a reading operation and until recording the image on the single sheet is completed in a recording operation.

27. The apparatus according to claim 21, wherein said image recording means is a serial thermal head.

28. The apparatus according to claim 21, wherein said reading means includes a photoelectric sensor for photoelectrically reading an image from the original.

29. The apparatus according to claim 21, wherein said reading means is a contact-type sensor.

30. The apparatus according to claim 21, wherein said feed path is capable of serving as both a feed path for allowing a sheet of paper for recording an image to be fed therethrough and a feed path for allowing an original for image reading to be fed therethrough.

31. The apparatus according to claim 21, further including a roller member serving as a recording-paper feed roller comprising a part of said recording means during recording and an original read platen comprising a part of said reading means during reading.

32. The apparatus according to claim 21, further including a flat plate serving as a flat platen comprising a part of said recording means during recording and an original read platen comprising a part of said reading means during reading.

33. The apparatus according to claim 21, further including a roller member serving as a platen roller comprising a part of said recording means during recording and an original read platen comprising a part of said reading means during reading.

34. The apparatus according to claim 21, wherein said reading means has a line sensor.

35. The apparatus according to claim 21, wherein said reading means has a serial sensor.

36. The apparatus according to claim 21, wherein said recording means is located downstream of said reading means with respect to a direction of which the sheet is fed.

37. The apparatus according to claim 21, wherein said recording means is located upstream of said reading means with respect to a direction in which the sheet is fed.

* * * * *

UNITED STATES PATENT AND TRADEMARK OFFICE
CERTIFICATE OF CORRECTION

PATENT NO. : 5,124,800

DATED : June 23, 1992

INVENTOR(S) : Kenichiro Hashimoto

It is certified that error appears in the above-identified patent and that said Letters Patent is hereby corrected as shown below:

TITLE PAGE,

[63] RELATED U.S. APPLICATION DATA:

"Oct. 27" should read --Oct. 22--.

COLUMN 2:

Line 30, "mean" should read --means--.
Line 44, "potion" should read --portion--.

COLUMN 10:

Line 2, "roller 306" should read --shaft 306--.
Line 28, "or" should read --or is--.

COLUMN 12:

Line 31, "gear clutch" should read --clutch gear--.

COLUMN 15:

Line 2, "pulley 1024a" should read --pulley 1027a--.
Line 51, "feeder) a" should read --feeder) which are previously mentioned. The principle of such a--.

COLUMN 16:

Line 29, "clutch" 1200" should read --clutch 1203--.

UNITED STATES PATENT AND TRADEMARK OFFICE
CERTIFICATE OF CORRECTION

PATENT NO. : 5,124,800
DATED : June 23, 1992
INVENTOR(S) : Kenichiro Hashimoto

It is certified that error appears in the above-identified patent and that said Letters Patent is hereby corrected as shown below:

COLUMN 17:

Line 21, "1100" should read --1110--.

COLUMN 20:

Line 21, "mean as" should read --means--.

Signed and Sealed this

Fourteenth Day of December, 1993

Attest:

BRUCE LEHMAN

Attesting Officer

Commissioner of Patents and Trademarks